(12) United States Patent
Wang et al.

(10) Patent No.: US 11,978,934 B2
(45) Date of Patent: May 7, 2024

(54) INTEGRATED FUEL CELL AND COMBUSTOR ASSEMBLY

(71) Applicant: General Electric Company, Schenectady, NY (US)

(72) Inventors: Honggang Wang, Clifton Park, NY (US); Michael A. Benjamin, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 197 days.

(21) Appl. No.: 17/406,894

(22) Filed: Aug. 19, 2021

(65) Prior Publication Data
US 2023/0070061 A1    Mar. 9, 2023

(51) Int. Cl.
*H01M 8/04* (2016.01)
*H01M 8/04701* (2016.01)
*H01M 8/04858* (2016.01)
*H01M 8/0662* (2016.01)
*H01M 8/24* (2016.01)

(52) U.S. Cl.
CPC ..... *H01M 8/0662* (2013.01); *H01M 8/04738* (2013.01); *H01M 8/0491* (2013.01); *H01M 8/24* (2013.01); *H01M 2250/20* (2013.01)

(58) Field of Classification Search
CPC .......... H01M 8/0662; H01M 8/04738; H01M 8/0491; H01M 8/24
See application file for complete search history.

(56) References Cited

U.S. PATENT DOCUMENTS

| | | |
|---|---|---|
| 7,456,517 B2 | 11/2008 | Campbell et al. |
| 7,966,830 B2 | 6/2011 | Daggett |
| 9,059,440 B2 | 6/2015 | Hotto |
| 9,068,748 B2 | 6/2015 | Hoke |
| 9,897,041 B2 | 2/2018 | Hoffjann et al. |
| 10,446,858 B2 | 10/2019 | Palumbo et al. |
| 10,724,432 B2 | 7/2020 | Shapiro et al. |
| 10,913,543 B2 | 2/2021 | Bailey et al. |
| 2006/0010866 A1 | 1/2006 | Rehg et al. |
| 2008/0001038 A1* | 1/2008 | Daggett ................ B64D 27/02 244/53 R |

(Continued)

OTHER PUBLICATIONS

Babu D. et al., "Optimization Of Pattern Factor Of The Annular Gas Turbine Combustor For Better Turbine Life," IOSR Journal of Mechanical and Civil Engineering, pp. 30-35.

(Continued)

*Primary Examiner* — Olatunji A Godo
(74) *Attorney, Agent, or Firm* — Dority & Manning, P.A.

(57) ABSTRACT

An integrated fuel cell and combustor assembly, and a related method. The assembly includes a combustor having a combustor geometry and a combustor exit temperature. The assembly further includes multiple fuel cells fluidly coupled to the combustor, the multiple fuel cells being configured to generate a fuel cell power output using fuel and air directed into the multiple fuel cells and to direct a fuel and air exhaust from the multiple fuel cells into the combustor. The multiple fuel cells include multiple fuel cell control groups arranged in a predetermined electrical configuration about the combustor geometry. Each of the multiple fuel cell control groups has an adjustable electrical current bias.

18 Claims, 12 Drawing Sheets

(56) References Cited

U.S. PATENT DOCUMENTS

2021/0003281 A1 1/2021 Amble et al.
2022/0285716 A1* 9/2022 Palumbo .......... H01M 8/04776

OTHER PUBLICATIONS

Mark et al., "Design and analysis of annular combustion chamber of a low bypass turbofan engine in a jet trainer aircraft," Propulsion and Power Research, vol. 5, Issue 2, pp. 97-107 (2015).

* cited by examiner

INTEGRATED FUEL CELL AND COMBUSTOR ASSEMBLY

TECHNICAL FIELD

The present disclosure generally relates to power-generating systems, such as fuel cells and gas turbine engines. In particular, the present disclosure relates to a gas turbine engine having an integrated fuel cell and combustor assembly.

BACKGROUND

Fuel efficiency of engines is an important consideration in the selection and operation of engines. For example, fuel efficiency of gas turbine engines used in aircraft is an important (and a limiting) factor on how far the aircraft can travel. Current aircraft jet engines generally provide mostly shaft (e.g., mechanical) power that is converted into propulsion using a fan mounted shaft and a small amount of power generation. Some aircraft propulsion systems include fuel cells in addition to the gas turbine engines. These fuel cells are located upstream of combustors of the gas turbine engines and downstream from compressors of the gas turbine engines. Compressed air that is output by the compressors flows along the length of the engine and into the fuel cells. A portion of this air is consumed by the fuel cells in generating electrical energy. The rest of the air flows through the fuel cells or around the fuel cells and into a combustor. This air is then mixed with fuel and combusted in a combustor of the engine.

Combustor exit temperature (T4) distribution is important for turbine and nozzle life, and combustor cooling is designed to attain an intended reference temperature distribution profile at the exit of a combustor. Any deviation from a design profile of T4 can lead to high thermal stress and, hence, reduce the life of the blade (and nozzle). Attaching Solid Oxide Fuel Cells (SOFC) around the liners of a combustor improves the efficiency and emission associated with the combustion in the combustor. Using SOFC to augment the T4 distribution needs a robust system architecture for integration of the SOFC and the combustor assembly due to low control flexibility of the fuel manifolds and the air manifolds of the SOFC at the combustor liners.

BRIEF DESCRIPTION OF THE DRAWINGS

Features, advantages, and embodiments of the present disclosure will be apparent from the following, more particular, description of various exemplary embodiments, as illustrated in the accompanying drawings, wherein like reference numbers generally indicate identical, functionally similar, and/or structurally similar elements.

DETAILED DESCRIPTION

Figure 1:
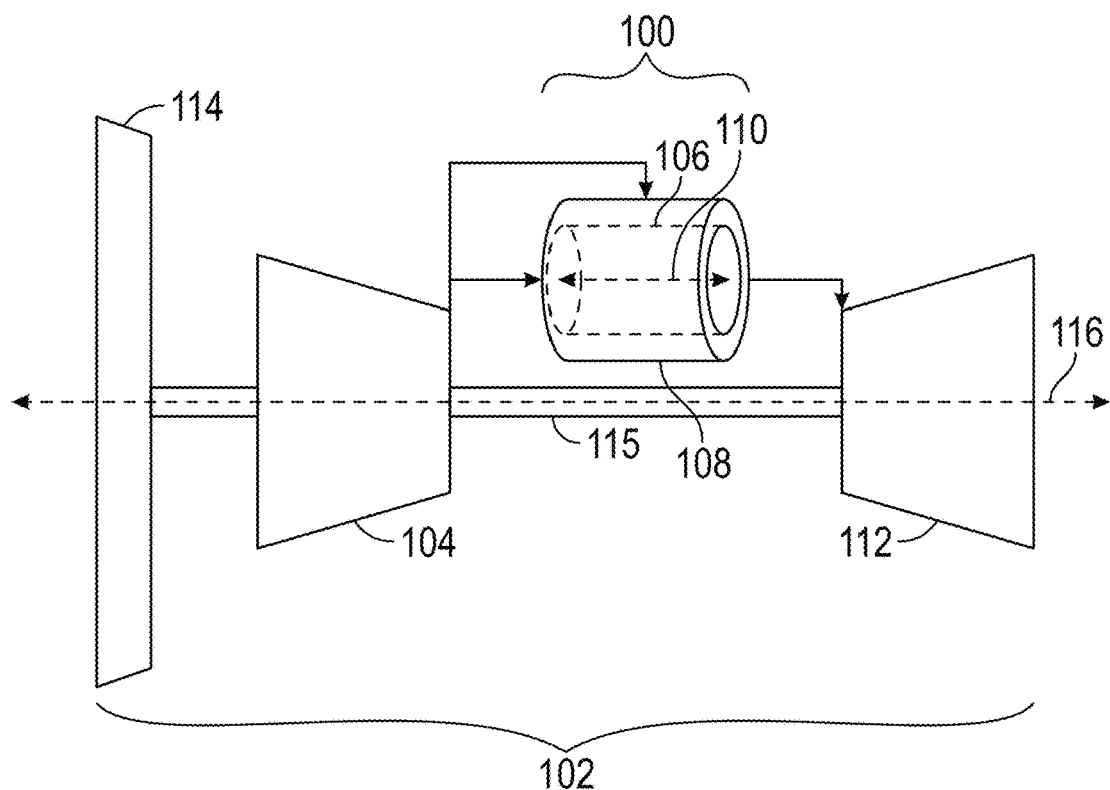
FIG. 1 shows a schematic illustration of an embodiment of an integrated fuel cell and combustor assembly used in a gas turbine engine, according to an embodiment of the present disclosure.

Various embodiments are discussed in detail below. While specific embodiments are discussed, this is done for illustration purposes only. A person skilled in the relevant art will recognize that other components and configurations may be used without departing from the spirit and scope of the present disclosure.

Reference will now be made in detail to present embodiments of the disclosed subject matter, one or more examples of that are illustrated in the accompanying drawings. The detailed description uses numerical and letter designations to refer to features in the drawings. Like or similar designations in the drawings and description have been used to refer to like or similar parts of the disclosed subject matter. As used herein, the terms "first," "second," "third," "fourth," and "exemplary" may be used interchangeably to distinguish one component from another and are not intended to signify location or importance of the individual components. Further, as used herein, the terms "fuel cell stack" and "plurality of fuel cells" and "multiple cells" and "multiple fuel cells" may be used interchangeably to distinguish one component from another and are not intended to signify location or importance of the individual components.

Gas turbine engines, such as those used to power aircrafts or industrial applications, include a compressor, a combustor, and a turbine, disposed about a central engine axis, with the compressor disposed axially upstream of the combustor and the turbine disposed axially downstream of the combustor. The compressor pressurizes a supply of air, the combustor burns a hydrocarbon fuel in the presence of the pressurized air, and the turbine extracts energy from the resultant combustion gases. Air pressure ratio and/or combustor temperature can be changed to improve gas turbine engine-cycle efficiencies. Further, any change in the air pressure ratio and/or combustor temperature can impact the operability and the life of the turbine.

Combustor exit temperatures (commonly known in the art as T4) above 1100° C. are common in gas turbine engines, while acceptable metal temperatures for the stationary nozzles and rotating blades of a turbine are limited to 900° C. or 1000° C. The temperature of a turbine blade impacts the mechanical strength of the blade (e.g., creep and fatigue) as well as the oxidation and corrosion resistance of the blade. Thus, maintaining the combustor exit temperature (T4) within an acceptable range considerably improves the life of the turbine blades and the turbine nozzles. Combustor cooling solutions are designed for a certain reference combustor exit temperature profile and any deviation from the reference profile can lead to thermal stress in the turbines and to reduction in the life of turbine blades and nozzles.

In an integrated design of Solid Oxide Fuel Cells (SOFC) and a gas turbine engine, SOFC are mechanically coupled at an outer liner surface of a combustor with SOFC exhaust gas (800° C., $H_2/CO/H_2O/CO_2$) injecting into the combustor. SOFC positioned at different regions within a zone of interest of the combustor liner (tangentially, radially, axially, and circumferentially) are electrically grouped in several fuel cell control groups so that the electrical current bias from the SOFC corresponding to regions having peak distribution of T4 and low distribution of T4 are adjusted. Specifically, the electrical current bias for each SOFC group is adjusted to achieve a desired T4 distribution along the tangential, radial, axial, and circumferential directions to achieve desired mitigation of T4 hot spots and more evened out average T4 distribution.

'Current biasing' is a commonly used scheme in electrical power control. 'Current bias' is known in the art as a controller bias exerted on the nominal value of an electrical current. Electrical power output from a fuel cell group equals the total amount of current output from the fuel cell group, multiplied by a voltage applied to the fuel cell group. Assuming there are three exemplary fuel cell control groups electrically connected in parallel and each fuel cell control group is electrically controlled by a corresponding power converter (either DC/DC converter or DC/AC inverter) connected to the fuel cell control group, the electrical current from each of the fuel cell control groups can be adjusted by controlling the corresponding power converter.

In the illustrative example above, if the voltage of each fuel cell control group is fixed at 100V, and the nominal current for each fuel cell control group is 100A, then the electric power output from each fuel cell control group is 10 kW and the total power output from the three fuel cell control groups, electrically connected in series, is 30 kW. There are multiple combinatory ways to trim or to bias the electrical current for each of the fuel cell control groups and still to maintain the total power constant (30 kW). The table below shows one example of such current biasing.

|  | Normal current (Ampere) | Bias current (Ampere) | Biased current (Ampere) |
|---|---|---|---|
| Group A | 100 | 0 | 100 |
| Group B | 100 | 5 | 105 |
| Group C | 100 | −5 | 95 |
| Total | 300 | 0 | 300 |

Given a total current demand of 300A, the normal current for each of the fuel cell control groups, in the beginning, is 100A. Adopting an exemplary current biasing scheme, if the current from fuel cell control group A remains unchanged, the current from fuel cell control group B needs to increase, and the current from the fuel cell control group C needs to decrease, then the current bias for the to fuel cell control group B can be set (+5A), for instance, and the current bias for the fuel cell control group C can be set (−5A) by the corresponding power converter controllers. The total current, by this current biasing scheme, still remains the same (300A) but more current is drawn from fuel cell control group B and less current is drawn from fuel cell control group C. The uneven current biasing of the fuel cell control groups is used for thermal balancing in a combustor liners, as will described in more detail below.

A 'current biasing' scheme, as described above, and used to adjust or spatially balance T4 temperature profile, can be achieved in both open loop control method and closed loop control method. As is known in the art, the electrical current bias of the fuel cell control groups, in an open loop control method, can be adjusted without any feedback from the combustor exit temperature. For example, the electrical current for fuel cell control groups can be adjusted using a predefined look-up table based on several flight parameters, such as, flight stage (take-off, cruise, descending), Mach number, and altitude. The look-up table can be obtained via offline tests or by using simulation model.

In a closed-loop control method, on the other hand, real time feedback of the combustor exit temperature or equivalents are used for adjustment of the electrical current bias of the fuel cell control groups. Compared to the open-loop control method, the closed-loop control can get a better control performance such as an actual T4 profile being closer to a reference T4 profile.

Both open loop and closed loop control methods require the fuel cell electrical connections or layout (parallel, series connections along tangential and/or axial direction of the combustor liner) to be predefined or preconfigured. The electrical layout is the enabler for any of the open loop and closed loop control methods. Once the electrical layout is configured, the connections are usually not changed on the fly. Instead, the electrical parameters of the fuel cells are changed to achieve the desired objective of spatially balancing a T4 temperature profile.

FIG. 1 shows a schematic illustration of an integrated fuel cell and combustor assembly 100 used in a gas turbine engine 102, according to an embodiment of the present disclosure. The gas turbine engine 102 includes one or more compressors 104 that receive inlet air and compress this air via one or more stages of rotating blades. The compressed air is directed into the fuel cell and combustor assembly 100.

The fuel cell and combustor assembly 100 includes a combustor 106 that is circumferentially surrounded along some of the length of the combustor 106 or all of the length of the combustor 106 by a fuel cell stack 108. The fuel cell stack 108 includes multiple fuel cells arranged to convert fuel and compressed air from the one or more compressors 104 into electrical energy. The fuel cell stack 108 is integrated into an outer portion of the combustor 106 such that the fuel cell stack 108 is part of the combustor 106 and is located radially outside of the combustor 106 (e.g., relative to an axis 110 of the combustor 106). The gas turbine engine 102 includes a center axis 116 that can be coincident with the axis 110 or need not be coincident with the axis 110.

Some of the compressed air exiting the one or more compressors 104 is directed through the fuel cells in the fuel cell stack 108 in radially inward directions toward the axis 110 of the combustor 106. Some of the remaining amount of compressed air or all of the remaining amount of compressed air from the one or more compressors 104 is directed into the combustor 106 in a direction along the axis 110 of the combustor 106 or parallel to the axis 110 of the combustor 106.

The fuel cells in the fuel cell stack 108 receive fuel from designated fuel manifolds (e.g., 200 shown in FIG. 2) and air from the one or more compressors 104, and convert the fuel and air into electrical energy. Combustor 106 is configured to combust partially oxidized fuel and air exhaust from the fuel, additional air from the one or more compressors 104, and/or additional fuel from one or more fuel injectors. Exhaust from the combusted fuel and air mixture is then directed into a turbine 112 that converts the exhaust into rotating energy that is used to power one or more loads 114, such as a fan used to propel a vehicle (e.g., an aircraft), a generator, or the like.

Figure 2:
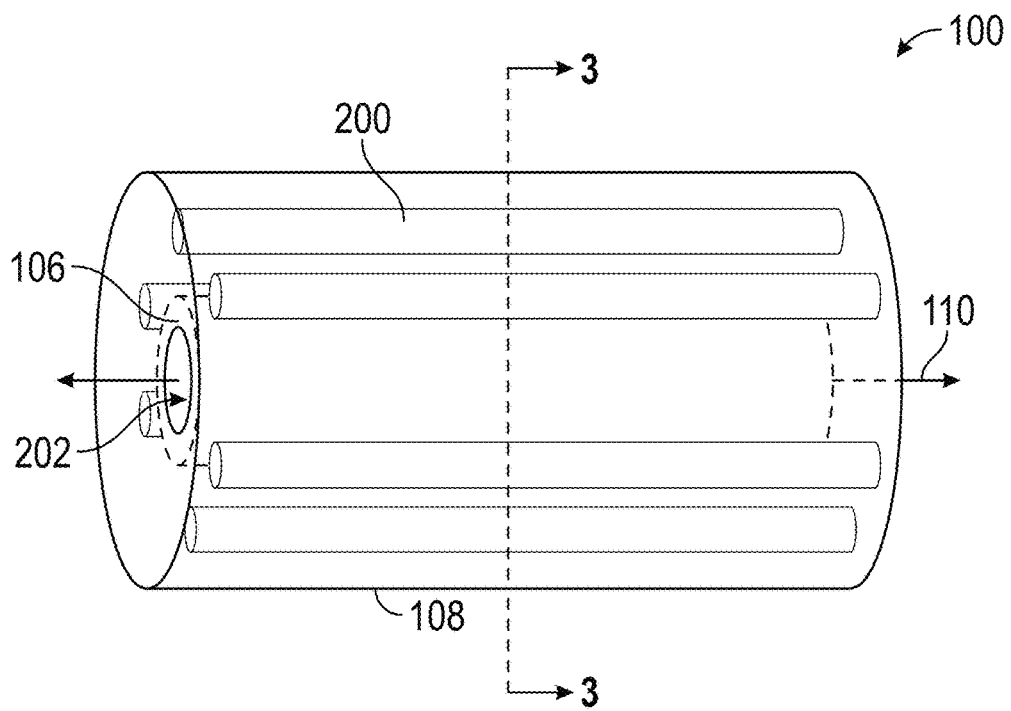
FIG. 2 shows a schematic illustration of an integrated fuel cell and combustor assembly used in a gas turbine engine, according to an embodiment of the present disclosure.

FIG. 2 shows a schematic illustration of the integrated fuel cell and combustor assembly 100 used in the gas turbine engine 102 of FIG. 1, according to an embodiment of the present disclosure. The fuel cell stack 108 includes a plurality of fuel manifolds 200 located at different locations about the perimeter of the combustor 106. The fuel cell stack 108 directly abuts the combustor 106 along the length of the combustor 106. The fuel cell stack 108 can form the outer liner of the combustor 106 or boundary of the combustor 106. Further, the fuel cell stack 108 is integrally formed with the combustor 106. An integral arrangement reduces or eliminates the need for additional ducting to fluidly couple the fuel cell stack 108 with the combustor 106.

The combustor 106 includes a combustion chamber 202 that is fluidly coupled with the one or more compressors 104 (FIG. 1), the turbine 112 (FIG. 1), and the fuel cell stack 108. The combustion chamber 202 receives unspent fuel and air from the fuel cell stack 108 and supplemental fuel and air from the one or more compressors 104. This supplemental fuel and air do not pass through any fuel cells in the fuel cell stack 108 or flow through any fuel cells in the fuel cell stack 108, and flows into the combustion chamber 202 in directions along the axis 110 or parallel to the axis 110.

Figure 3:
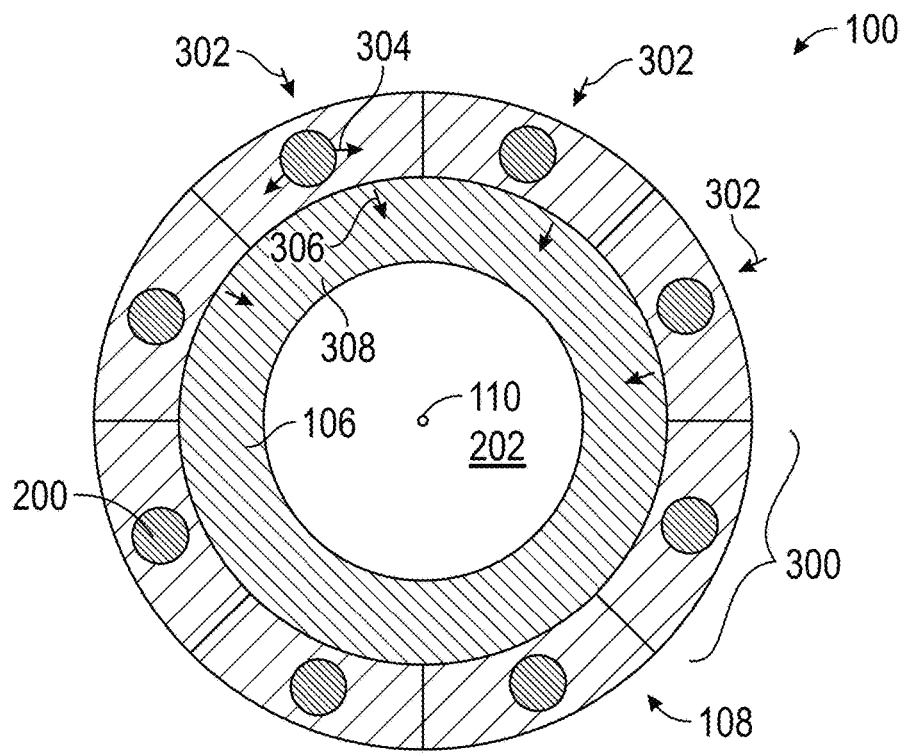
FIG. 3 shows a schematic cross-sectional view of a fuel cell of the integrated fuel cell and combustor assembly taken along the line 3-3 of FIG. 2, according to an embodiment of the present disclosure.

FIG. 3 shows a cross-sectional view of a fuel cell 300 of the integrated fuel cell and combustor assembly 100 taken along line 3-3 of FIG. 2, according to an embodiment of the present disclosure. As shown, the fuel cell stack 108 circumferentially extends around the combustion chamber 202 of the combustor 106 (FIG. 1) by completely encircling the combustion chamber 202 around the axis 110. The fuel cells 300 are formed as parts of the fuel cell stack 108. The fuel cells 300 that are visible in FIG. 3 can be a single ring of fuel cells 300, with fuel cells 300 axially stacked together to form the fuel cell stack 108. In another instance, multiple additional rings of fuel cells 300 can be placed on top of each other to form the fuel cell stack 108 that is elongated along the axis 110.

The fuel cells 300 in the fuel cell stack 108 are positioned to receive discharged air 302 from the one or more compressors 104 and fuel 304 from the plurality of fuel manifolds 200. The fuel cells 300 generate electrical current bias using this air 302 and at least some of this fuel 304, and radially direct partially oxidized fuel 306 and unused portion of air 308 into the combustion chamber 202 of the combustor 106 toward the axis 110. The combustor 106 combusts the partially oxidized fuel 306 and air 308 in the combustion chamber 202 into one or more gaseous combustion products (e.g., exhaust) that are directed downstream into the turbine 112 (FIG. 1) and drive the turbine 112.

Figure 4:
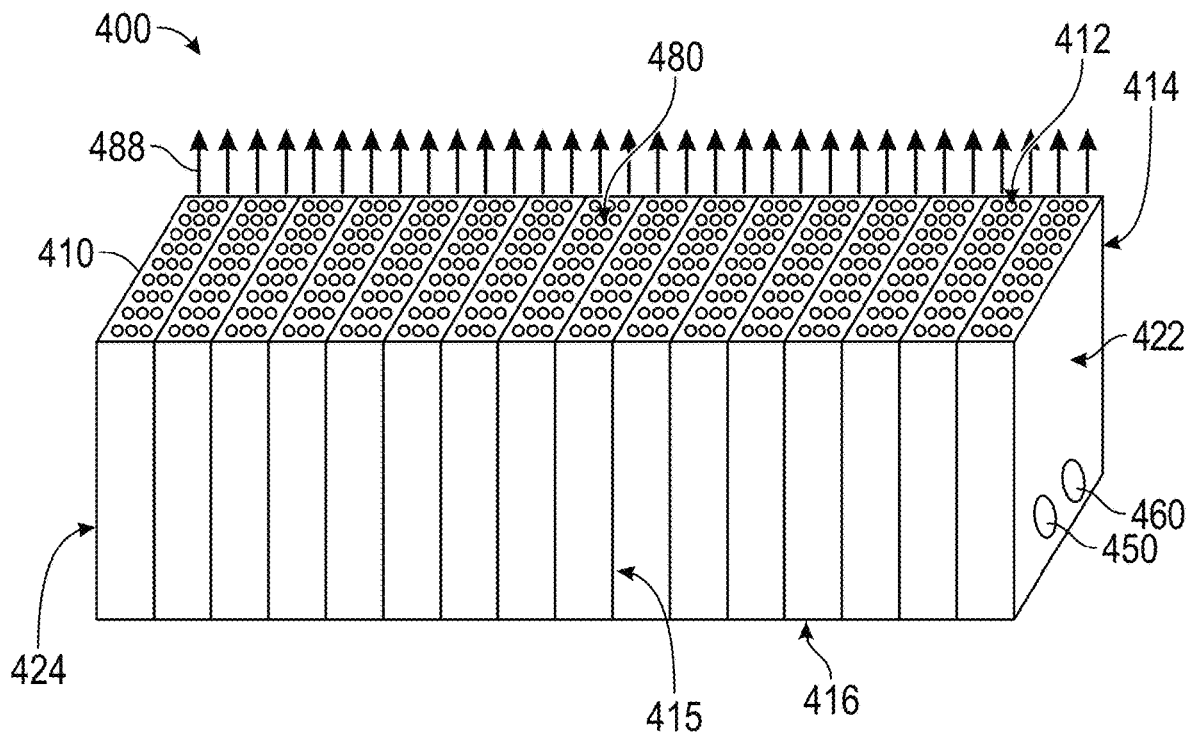
FIG. 4 shows a schematic illustration as a perspective view of fuel cells of an integrated fuel cell and combustor assembly used in a gas turbine engine, according to an embodiment of the present disclosure.

FIG. 4 shows a schematic illustration as a perspective view of the fuel cells (e.g., 300 shown in FIG. 3) used in an integrated fuel cell and combustor system 400 used in the gas turbine engine 102 of FIG. 1 that is further described in, e.g., US 2020/0194799 A1, that is incorporated by reference herein in its entirety. The fuel cell and combustor system 400 includes a housing 410 having a combustion outlet side 412 and a side 416 that is opposite to the combustion outlet side 412, a fuel and air inlet side 422 and a side 424 that is opposite to the fuel and air inlet side 422, and sides 414, 415. The side 414 and the side 416 are not visible in the perspective view of FIG. 4.

The combustion outlet side 412 includes a plurality of combustion outlets 480 and combustion gas 488 is directed from the combustion outlets 480 out of the housing 410. As described herein, the combustion gas 488 is generated using fuel and air that is not consumed by the fuel cells (e.g., 300 shown in FIG. 3) in a fuel cell stack (e.g., 108 shown in FIG. 3) inside the housing 410. The combustion gas 488 is used to generate propulsion for a vehicle or thrust for a vehicle, such as a manned aircraft or an unmanned aircraft.

The fuel and air inlet side 422 includes one or more fuel inlets 450 and one or more air inlets 460. Optionally, the one or more of the inlets 450, 460 can be on another side of the housing 410. Each of the one or more fuel inlets 450 is fluidly coupled with a source of fuel for the fuel cells, such as one or more pressurized containers of a hydrogen-containing gas and/or a catalytic partial oxidation converter (CPOx) as described further below. Each of the one or more air inlets 460 is fluidly coupled with a source of air for the fuel cells, such as air that is discharged from a compressor provided with a gas turbine engine and/or a preburner system as described further below. The inlets 450, 460 separately receive the fuel and air from the external sources of fuel and air, and separately direct the fuel and air into the fuel cells.

Figures 5A, 5B:
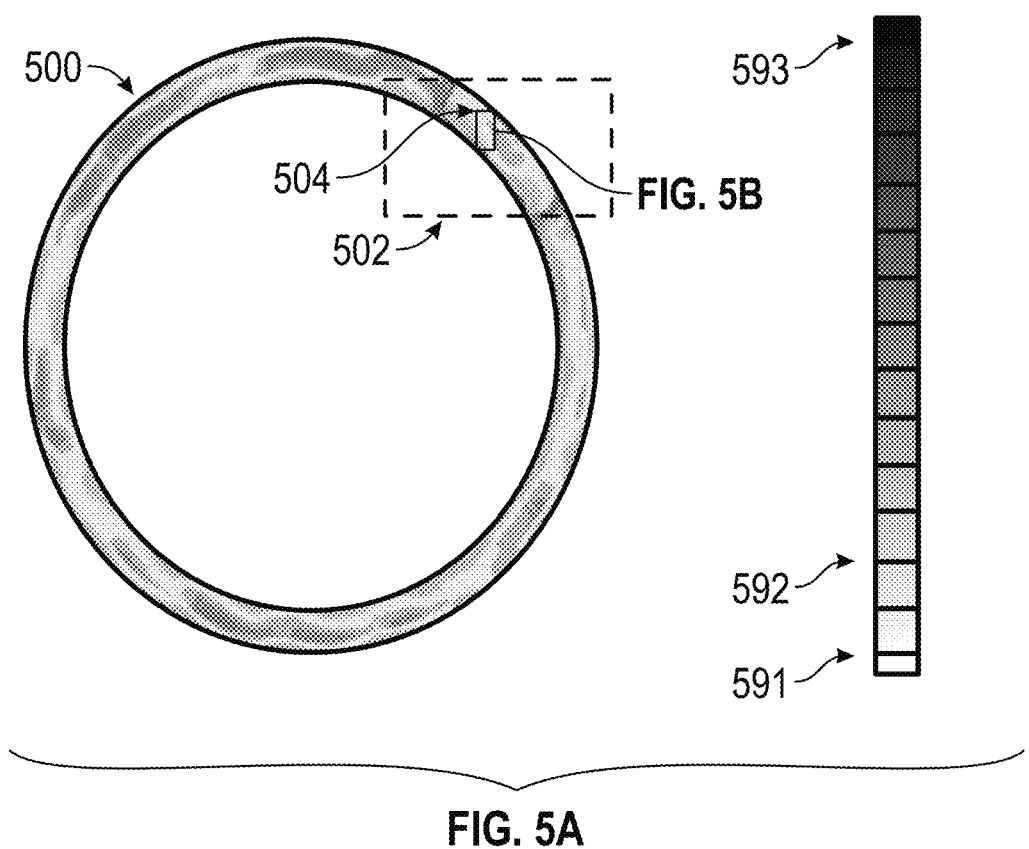
FIG. 5A shows a schematic visualization of temperature distribution across a cross section of a combustor of an integrated fuel cell and combustor assembly used in a gas turbine engine, according to an embodiment of the present disclosure.
FIG. 5B shows a schematic illustration of an exemplary fuel cell control group of FIG. 5A, as used in an integrated fuel cell and combustor assembly of a gas turbine engine, according to an embodiment of the present disclosure.
Figure 5B:
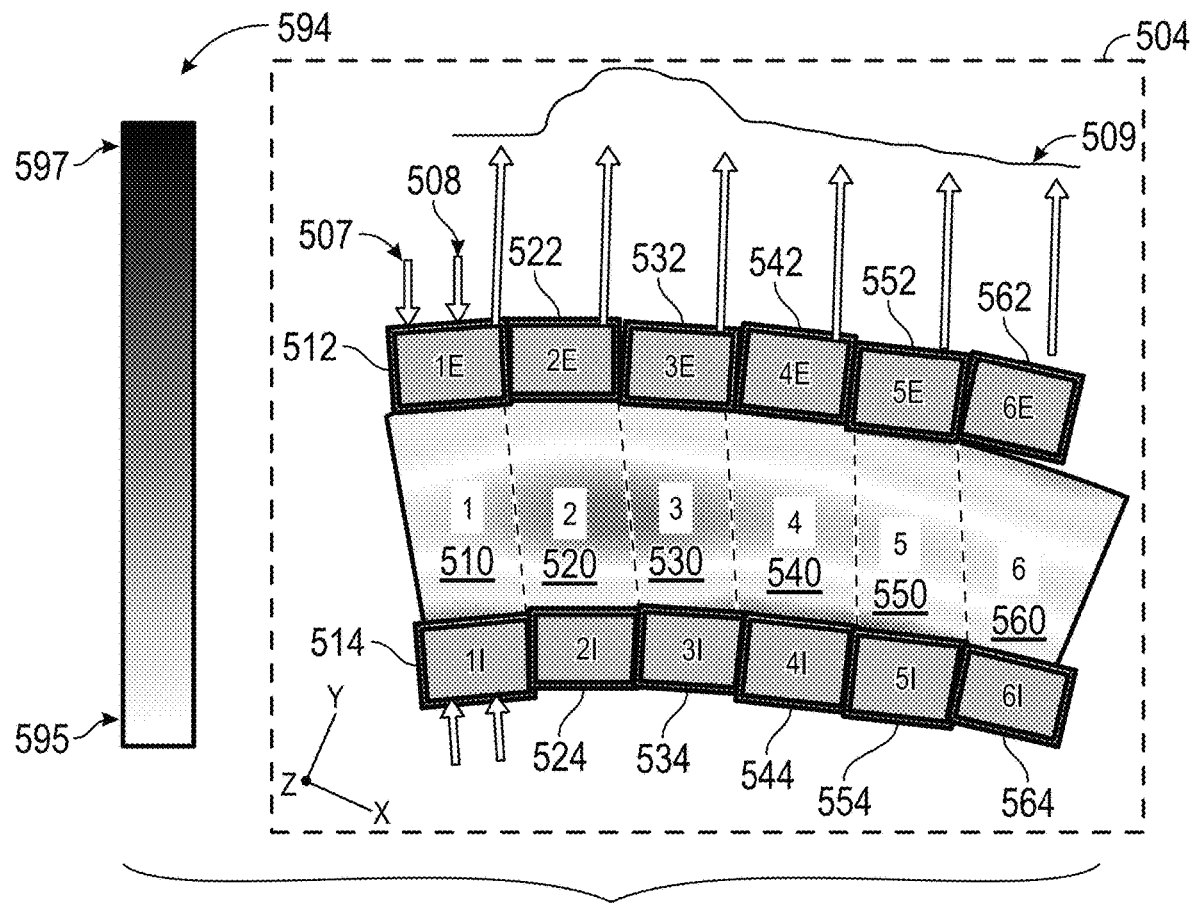

FIG. 5A shows a schematic visualization of temperature distribution across a cross section of a combustor of the integrated fuel cell and combustor assembly 100 used in the gas turbine engine 102 of FIG. 1, according to an embodiment of the present disclosure. Referring to FIG. 5A, an enlarged view of a combustor cross section 500 includes an exemplary segment or a zone of interest 502. The zone of interest 502 is fluidly connected to an exemplary fuel cell control group 504 and cooperates with the exemplary fuel cell control group 504.

A heat-map scale 592, characterized by a greyscale, represents a distribution of temperature across the combustor cross section 500. The greyscale has a light band 591 at one end and a dark band 593 at the other end. There are several intermediate, transitional shades of grey between the light band 591 and the dark band 593. The darkness of the greyscale is proportional to the intensity of the variable the greyscale is representing, temperature in this case. Referring to the heat-map scale 592 of FIG. 5A, the lighter a zone (e.g., 591) is on the heat-map scale 592, the lower is the temperature associated and the cooler is the zone. Conversely, the darker a zone (e.g., 593) is, the higher is the temperature associated and the hotter is the zone.

FIG. 5B shows a schematic illustration of the exemplary fuel cell control group 504 of FIG. 5A, as used in the integrated fuel cell and combustor assembly 100 used in the gas turbine engine 102 of FIG. 1, according to an embodiment of the present disclosure. Referring to FIG. 5B, an exemplary fuel cell control group 512 receives fuel 507 and air 508 to continue to operate, while the fuel and air streams for other fuel cell control groups (522, 532, 542, 552, 562) and (514, 524, 534, 544, 554, 564) are supplied in an analogous way and not shown in FIG. 5A. An electrical current profile 509 schematically represents a distribution of electrical current drawn from fuel cell control groups 512, 522, 532, 542, 552, 562 and, optionally, fuel cell control groups 514, 524, 534, 544, 554, 564, at any instant, corresponding to the exemplary zone of interest 502 (FIG. 5A) in comparison with a reference electrical current scale 594.

In this example, each of fuel cell control groups (512, 522, 532, 542, 552, 562) includes multiple fuel cells stacked along an axial direction of the combustor. For instance, the exemplary fuel cell control group 512 can include one hundred (100) fuel cells electrically connected in series and stacked along the axial direction of the combustor. The electrical current drawn from each of the fuel cell control groups (512, 522, 532, 542, 552, 562), in that case, is the same. Further, the electrical current drawn from any of the fuel cell control groups (512, 522, 532, 542, 552, 562) can be adjusted independently from the electrical current drawn from any other of the fuel cell control groups (512, 522, 532, 542, 552, 562).

The reference electrical current scale 594, characterized by a greyscale, represents distribution of electrical current related to the exemplary fuel cell control group 504. The greyscale has a light band 595 at one end and a dark band 597 at the other end. There are several intermediate, transitional shades of grey between the light band 595 and the dark band 597. The darkness of the greyscale is proportional to the electrical current drawn from a corresponding fuel cell control group (e.g., 504). Referring to the reference electrical current scale 594 of FIG. 5B, the lighter a zone (e.g., 595) is, the lower is the electrical current drawn from a corresponding fuel cell control group. Conversely, the darker a zone (e.g., 597) is, the higher is the electrical current drawn from a corresponding fuel cell control group.

Further, the exemplary zone of interest 502 (FIG. 5A) is segmented into several regions of interest such as a first control region 510, a second control region 520, a third control region 530, a fourth control region 540, a fifth control region 550, a sixth control region 560, and so on. In the non-limiting example of FIG. 5B, there are six exemplary control regions embodied as 510, 520, 530, 540, 550, and 560, but, there can be fewer than six control regions or more than six control regions. The number of exemplary control regions can be selected based on the number of the zones of interest 502 and spatial expanse of the zones of interest 502.

The fuel cell control groups 512, 522, 532, 542, 552, and 562 (part of the whole fuel cell groups) are attached on the outer side of the combustor liner, wherein the electrical current bias of the fuels cell in each control group (or row) is adjusted independently, within a certain range. Optionally, the fuel cell control groups 514, 524, 534, 544, 554, and 564 are mechanically attached on the inner liner of the combustor close to a shaft axis in the center. The electrical connections for the fuel cell control groups 514, 524, 534, 544, 554, and 564 can be the same with the fuel cell control groups 512, 522, 532, 542, 552, and 562 to have thermal adjustment capability in respective regions of interest or control regions embodied as 510, 520, 530, 540, 550, and 560.

Continuing to refer to FIG. 5B, the first control region 510 is fluidly coupled to a first exterior fuel cell control group 512 and cooperates with the first exterior fuel cell control group 512 and, optionally, a first interior fuel cell control group 514. In a similar manner, the second control region 520 is fluidly coupled to a second exterior fuel cell control group 522 and cooperates with the second exterior fuel cell control group 522 and, optionally, a second interior fuel cell control group 524. The third control region 530 is fluidly coupled to a third exterior fuel cell control group 532 and cooperates with the third exterior fuel cell control group 532 and, optionally, a third interior fuel cell control group 534. The fourth control region 540 is fluidly coupled to a fourth exterior fuel cell control group 542 and cooperates with the fourth exterior fuel cell control group 542, and, optionally, a fourth interior fuel cell control group 544. The fifth control region 550 is fluidly coupled to a fifth exterior fuel cell control group 552 and cooperates with the fifth exterior fuel cell control group 552 and, optionally, a fifth interior fuel cell control group 554. The sixth control region 560 is fluidly coupled to a sixth exterior fuel cell control group 562 and cooperates with the sixth exterior fuel cell control group 562, and, optionally, a sixth interior fuel cell control group 564.

Figure 5C:
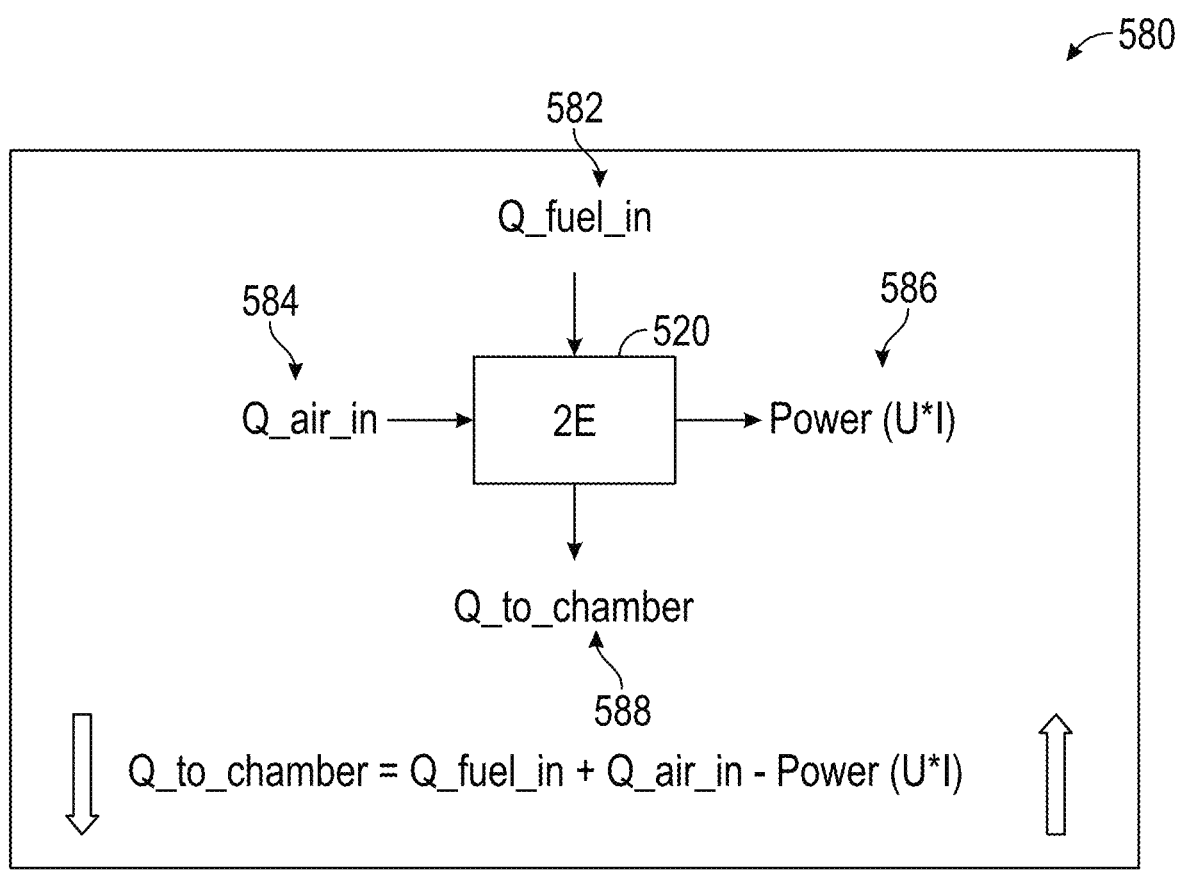
FIG. 5C shows a schematic illustration of spatial balancing of mass and energy in a zone of interest in the cross section of the combustor of FIG. 5A, as used in an integrated fuel cell and combustor assembly of a gas turbine engine, according to an embodiment of the present disclosure.

FIG. 5C shows a schematic illustration of spatial balancing of mass and energy in a zone of interest in the combustor cross section 500 of FIG. 5A, as used in the integrated fuel cell and combustor assembly 100 used in the gas turbine engine 102 of FIG. 1, according to an embodiment of the present disclosure. Referring to FIG. 5C, the functional representation of quantity energy balance of the exemplary fuel cell control group 504 (FIG. 5B) at a predetermined spatial location 580 includes a quantity of air and fuel 588 ($Q\_to\_chamber$) entering combustion chamber, a quantity of fuel 582 ($Q\_fuel\_in$) entering fuel cell control group, a quantity of air 584 ($Q\_air\_in$) entering fuel cell control group, and an amount of power 586 (Power=U*I) extracted from the fuel cell control group.

$$Q\_to\_chamber = Q\_fuel\_in + Q\_air\_in - \text{Power}(U*I)$$

Further, at any point of operation, in conformance with the spatial balancing equation at any specific zone of interest, as represented above, the net heat release equals to the enthalpy brought in by fuel and air entering the fuel cells minus the extracted electrical power output from the fuel cell. Power output, mathematically, is a product of voltage across a fuel cell and the electrical current drawn from the fuel cell. In other words, by controlling the power output or the constituents of the power output, the electrical current bias drawn from a fuel cell and, thereby, the enthalpy supply from a fuel cell to the combustor is controlled, and that, in turn, controls the thermal balance and resulting heat output at that specific combustor zone of interest.

In operation, when there are hot spots (as visualized by the heat-map scale 592 shown in FIG. 5A), for example, in the second control region 520 (FIG. 5B) and the third control region 530 (FIG. 5B) in the combustor exit plane, the electrical current (as visualized by the reference electrical current scale 594) drawn from the corresponding fuel cell control groups (522/524 and 532/534, respectively) is adjusted, so that more internal energy converts to electrical power in the second control region 520 and in the third control region 530, with less combustion enthalpy left for injecting into these regions. The hot spot in the second control region 520 and in the third control region 530 are reduced this way and even eliminated. Similar spatial balancing is applied in the axial direction to balance the axial temperature profile at combustion exit.

Referring to FIGS. 5A, 5B, and 5C, multiple fuel cells are grouped into collections of fuel cell control groups (512, 522, 532, 542, 552, 562 and, optionally, 514, 524, 534, 544, 554, 564), unified by a common spatial relationship with respect to the combustion geometry and arranged in a predetermined configuration about the combustor geometry. Fuel cells that are part of a fuel cell control group are individually controllable and a controller (e.g., controller 970 shown in FIG. 9) is configured to selectively control an electrical current bias for each of the fuel cell control groups (512, 522, 532, 542, 552, 562 and, optionally, 514, 524, 534, 544, 554, 564). The common spatial relationship can be proximity of the cells in a tangential direction of the combustor. The common spatial relationship can be proximity of the cells a radial direction of the combustor. The common spatial relationship can be proximity of the cells in an axial direction of the combustor. The common spatial relationship can be proximity of the cells as part of a common circumferential section of the combustor.

Specifically, when the combustor exit temperature T4 for a specific zone or region is equal to a predefined threshold or exceeds a predefined threshold, electrical current bias for the corresponding fuel cell control groups is increased. Conversely, when the combustor exit temperature or a specific zone or region is lower than a predefined threshold, the electrical current bias for the corresponding fuel cell control groups is decreased. Operationally, the electrical current bias for the fuel cell control groups is increased or the electrical current bias for the fuel cell control groups is decreased by adjusting power converter parameters, fuel utilization, or oxygen-to-fuel ratio of a fuel processing unit, or a total fuel flow rate, or a temperature of the plurality of fuel cells, or any combination thereof.

Figure 6A:
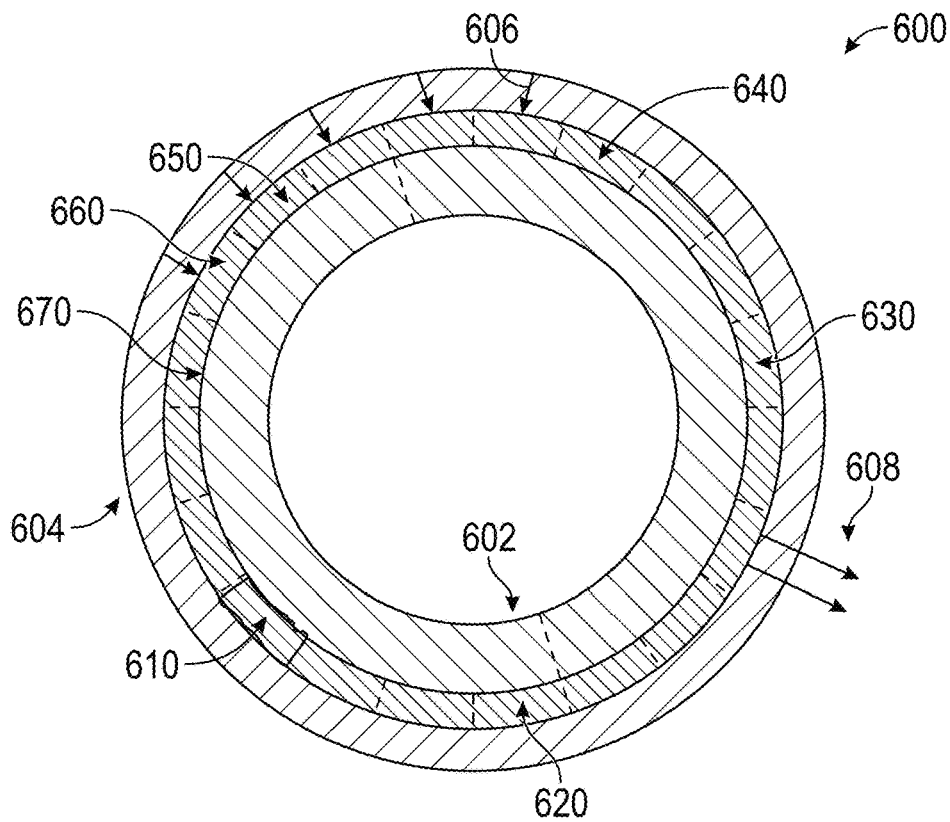
FIG. 6A shows a schematic cross-sectional view of an outer perimetral zone of interest in a combustor cross section of an integrated fuel cell and combustor assembly of a gas turbine engine, according to an embodiment of the present disclosure.

FIG. 6A shows a schematic cross-sectional view of an outer perimetral zone of interest in a combustor cross section 600 of the integrated fuel cell and combustor assembly 100 used in the gas turbine engine 102 of FIG. 1, according to an embodiment of the present disclosure. Referring to FIG. 6A, this example illustrates use of an electrically controlled distributed group of SOFC positioned along a perimetral zone extending along an outer perimeter of the combustor liner, to adjust the temperature distribution along the outer perimeter of the combustor exit.

Referring to FIG. 6A, the schematic functional representation of balancing combustor exit temperature at an outer perimeter of the combustor cross section 600 includes an exemplary zone of interest 670 (i.e., the perimetral ring) on the combustor cross section 600, the inner cross section 602, a fuel supply ring 604 for supplying fuel to the combustor chamber, a plurality of fuel supply manifolds 606 for supplying fuel to the combustor chamber, a plurality of electrical cables 608 for power output from the fuel cells, and the exemplary fuel cell control groups 610, 620, 630, 640, 650, and 660 extending along the perimetral ring 670 of the combustor.

Referring to FIG. 6A, each of the fuel cell control groups, such as, the first fuel cell control group 610, the second fuel cell control group 620, the third fuel cell control group 630, the fourth fuel cell control group 640, the fifth fuel cell control group 650, the sixth fuel cell control group 660, and so on, is associated with a corresponding, circumferentially positioned, control region of the exemplary zone of interest 670 (i.e., the perimetral ring). In the non-limiting example of FIG. 6A, there are six exemplary fuel cell control groups embodied as 610, 620, 630, 640, 650, and 660, but, there can be fewer than six fuel cell control groups or more than six fuel cell control groups. The number of exemplary fuel cell control groups can be selected based on the spatial expanse of the zone of interest 670 and the number of the control regions associated with the zone of interest 670.

Figure 6B:
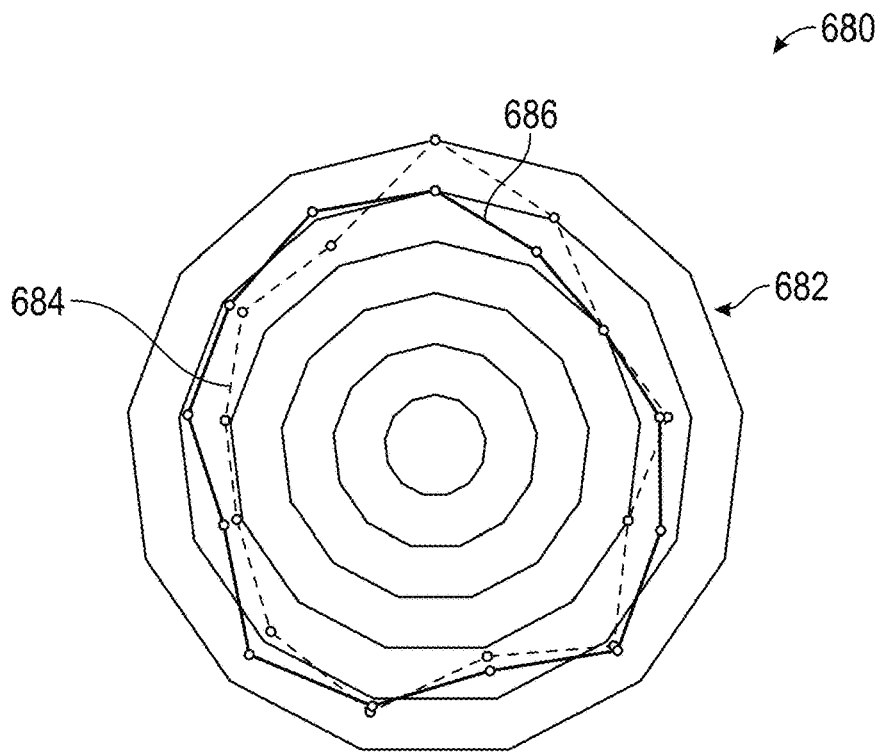
FIG. 6B shows a schematic visualization of temperature distribution across the outer perimetral zone of interest in the combustor cross section of FIG. 6A as used in an integrated fuel cell and combustor assembly of a gas turbine engine, according to an embodiment of the present disclosure.

FIG. 6B shows a schematic visualization of temperature distribution across the perimetral ring 670 in the combustor cross section of FIG. 6A, as used in the integrated fuel cell and combustor assembly 100 used in the gas turbine engine 102 of FIG. 1, according to an embodiment of the present disclosure. In operation, when there are hot spots in control regions corresponding to the second fuel cell control group 620 and the third fuel cell control group 630 in the perimetral ring 670, for instance, the electrical current drawn from the corresponding fuel cell control groups 620 and 630 are adjusted, so that more internal energy converts to electrical power in the control regions corresponding to the fuel cell control groups 620 and 630, with less combustion enthalpy left for injecting into the hot spot control regions. The hot spots in the control regions corresponding to the second fuel cell control group 620 and the third fuel cell control group 630 are reduced this way, and even eliminated. Similar spatial balancing is applied in the axial direction to balance the axial temperature profile at combustion exit.

Referring to FIG. 6B, a functional representation 680 shows balancing combustor exit temperature (T4) at the perimetral ring 670 (FIG. 6A) in reference to a circular grid scale reference 682. For any peripheral position of a point on the perimetral ring 670, the corresponding radial distance on the circular grid scale reference 682 is proportional to the combustor exit temperature (T4) at the peripheral position. In other words, the farther a point out radially on the circular grid scale reference 682, the higher is the corresponding T4 at the point.

An actual temperature distribution 684 shows widely varying radial distances for several perimetral points plotted across the circular grid scale reference 682 and indicates a temperature distribution that is, at an exemplary instant, out of balance. The spatial balancing method mentioned above is applied subsequently to bring balance, and a temperature distribution 686 is obtained as a result. Specifically, the points on the temperature distribution 686 are at more uniform radial distances across the circular grid scale reference 682 and indicate a balanced spatial distribution of T4 across a zone of interest, such as, the perimetral ring 670 (FIG. 6A).

Figures 7A, 7B:
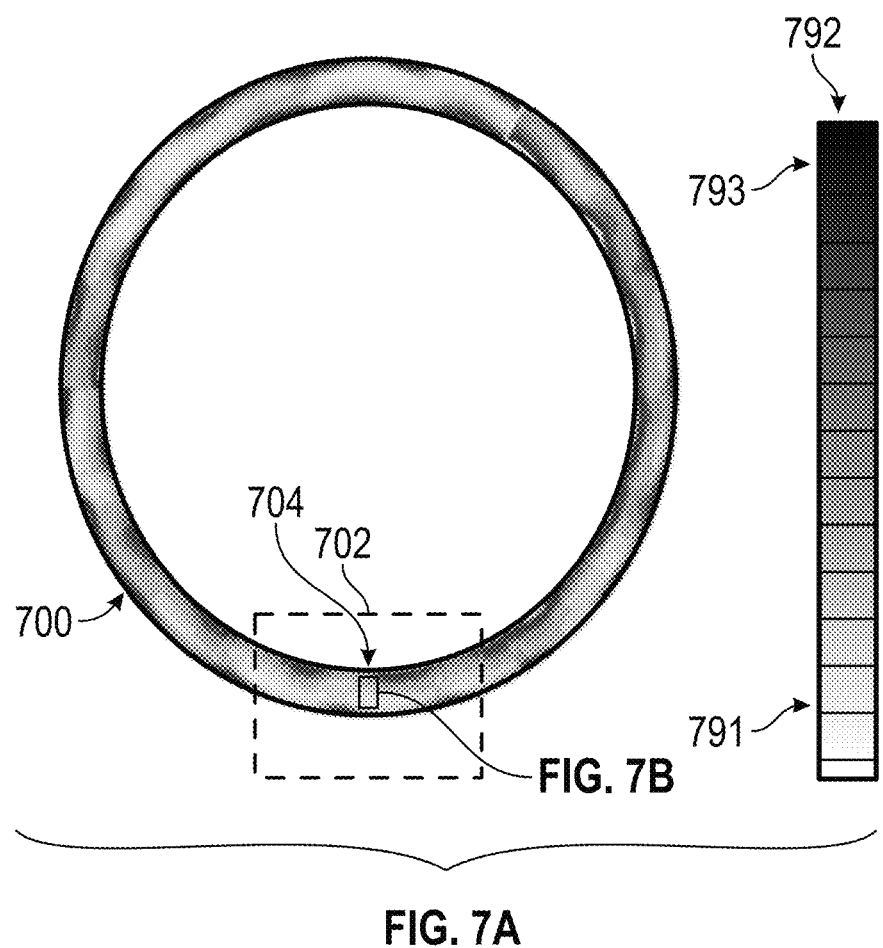
FIG. 7A shows a schematic visualization of temperature distribution across a cross section of a combustor of an integrated fuel cell and combustor assembly with an unsymmetrical layout of an exemplary fuel cell control group, as used in a gas turbine engine, according to an embodiment of the present disclosure.
FIG. 7B shows a schematic illustration of an exemplary unsymmetrical layout of an exemplary fuel cell control group of FIG. 7A, as used in an integrated fuel cell and combustor assembly of a gas turbine engine, according to an embodiment of the present disclosure.
Figure 7B:
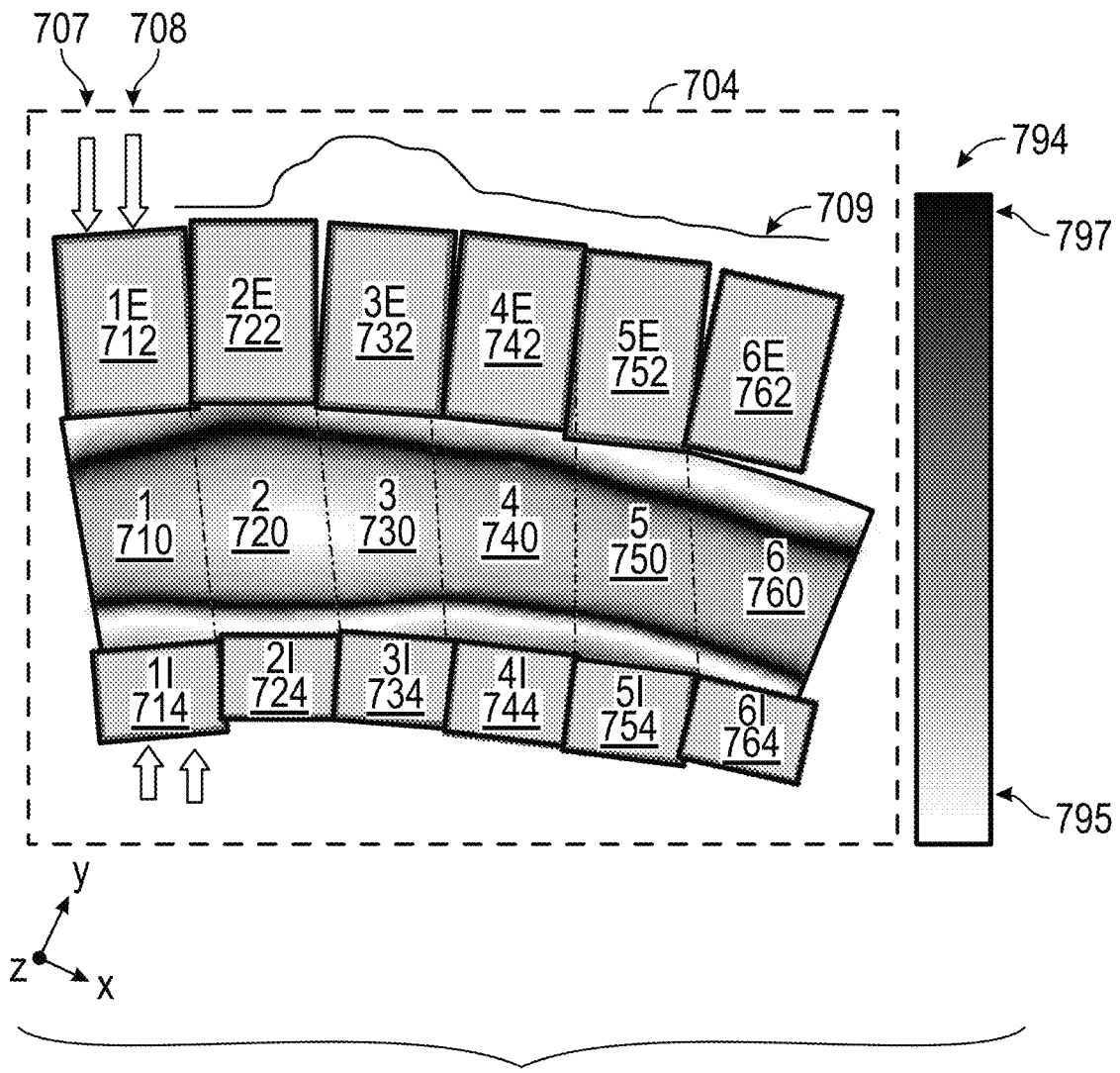

FIG. 7A shows a schematic visualization of a temperature distribution across a cross section of a combustor of the integrated fuel cell and combustor assembly 100 with an unsymmetrical SOFC layout, as used in the gas turbine engine 102 of FIG. 1, according to an embodiment of the present disclosure. Referring to FIG. 7A, an enlarged view of a combustor cross section 700 includes an exemplary segment or a zone of interest 702 as part of the combustor cross section 700. The zone of interest 702 is fluidly connected to an exemplary fuel cell control group 704 and cooperates with the exemplary fuel cell control group 704.

A heat-map scale 792, characterized by a greyscale, represents a distribution of temperature across the combustor cross section 700. The greyscale has a light band 791 at one end and a dark band 793 at the other end. There are several intermediate, transitional shades of grey between the light band 791 and the dark band 793. Referring to heat-map scale 792 of FIG. 7A, the lighter a zone (e.g., 791) is on the heat-map scale 792, the lower is the temperature associated and the cooler is the zone. Conversely, the darker a zone (e.g., 793) is, the higher is the temperature associated and hotter is the zone.

FIG. 7B shows a schematic illustration of an exemplary unsymmetrical layout of the exemplary fuel cell control group 704 of FIG. 7A, as used in the integrated fuel cell and combustor assembly 100 used in the gas turbine engine 102 of FIG. 1, according to an embodiment of the present disclosure. Referring to FIG. 7B, the fuel cell control group 704 receives fuel 707 and air 708 to continue to operate. An electrical current profile 709 schematically represents a distribution of electrical current drawn from control fuel groups 712, 722, 732, 742, 752, 762 and, optionally, 714, 724, 734, 744, 754, 764, at any instant, corresponding to the exemplary zone of interest 702 (FIG. 7A) in comparison with a reference electrical current scale 794.

The reference electrical current scale 794, characterized by a greyscale, represents a distribution of electrical current related to exemplary fuel cell control group 704. The greyscale has a light band 795 at one end and a dark band 797 at the other end. There are several intermediate, transitional shades of grey between the light band 795 and the dark band 797. The darkness of the greyscale is proportional to the electrical current drawn from a corresponding fuel cell control group (e.g., 704). Referring to the reference electrical current scale 794 of FIG. 7B, the lighter a zone (e.g., 795) is, the lower is the electrical current drawn from a corresponding fuel cell control group. Conversely, the darker a zone (e.g., 797) is, the higher is the electrical current drawn from a corresponding fuel cell control group.

The exemplary zone of interest 702 (FIG. 7A) is segmented into several regions of interest such as first control region 710, second control region 720, third control region 730, fourth control region 740, fifth control region 750, sixth control region 760, and so on. In the non-limiting example of FIG. 7B, there are six control regions 710, 720, 730, 740, 750, and 760, but, there can be fewer than six control regions or more than six control regions. The number of exemplary control regions can be selected based on the number of the zones of interest of the fuel cell control group 704 or the spatial expanse of the zones of interest of the fuel cell control group 704.

Continuing to refer to FIG. 7B, the first control region 710 is fluidly coupled to a first exterior fuel cell control group 712 and cooperates with the first exterior fuel cell control group 712 and, optionally, first interior fuel cell control group 714. In a similar manner, the second control region 720 is fluidly coupled to a second exterior fuel cell control group 722 and cooperates with the second exterior fuel cell control group 722 and, optionally, a second interior fuel cell control group 724. The third control region 730 is fluidly coupled to a third exterior fuel cell control group 732 and cooperates with the third exterior fuel cell control group 732 and, optionally, a third interior fuel cell control group 734. The fourth control region 740 is fluidly coupled to a fourth exterior fuel cell control group 742 and cooperates with the fourth exterior fuel cell control group 742 and, optionally, a fourth interior fuel cell control group 744. The fifth control region 750 is fluidly coupled to a fifth exterior fuel cell control group 752 and cooperates with the fifth exterior fuel cell control group 752 and, optionally, a fifth interior fuel cell control group 754. The sixth control region 760 is fluidly coupled to a sixth exterior fuel cell control group 762 and cooperates with the sixth exterior fuel cell control group 762 and, optionally, a sixth interior fuel cell control group 764.

Figure 7C:
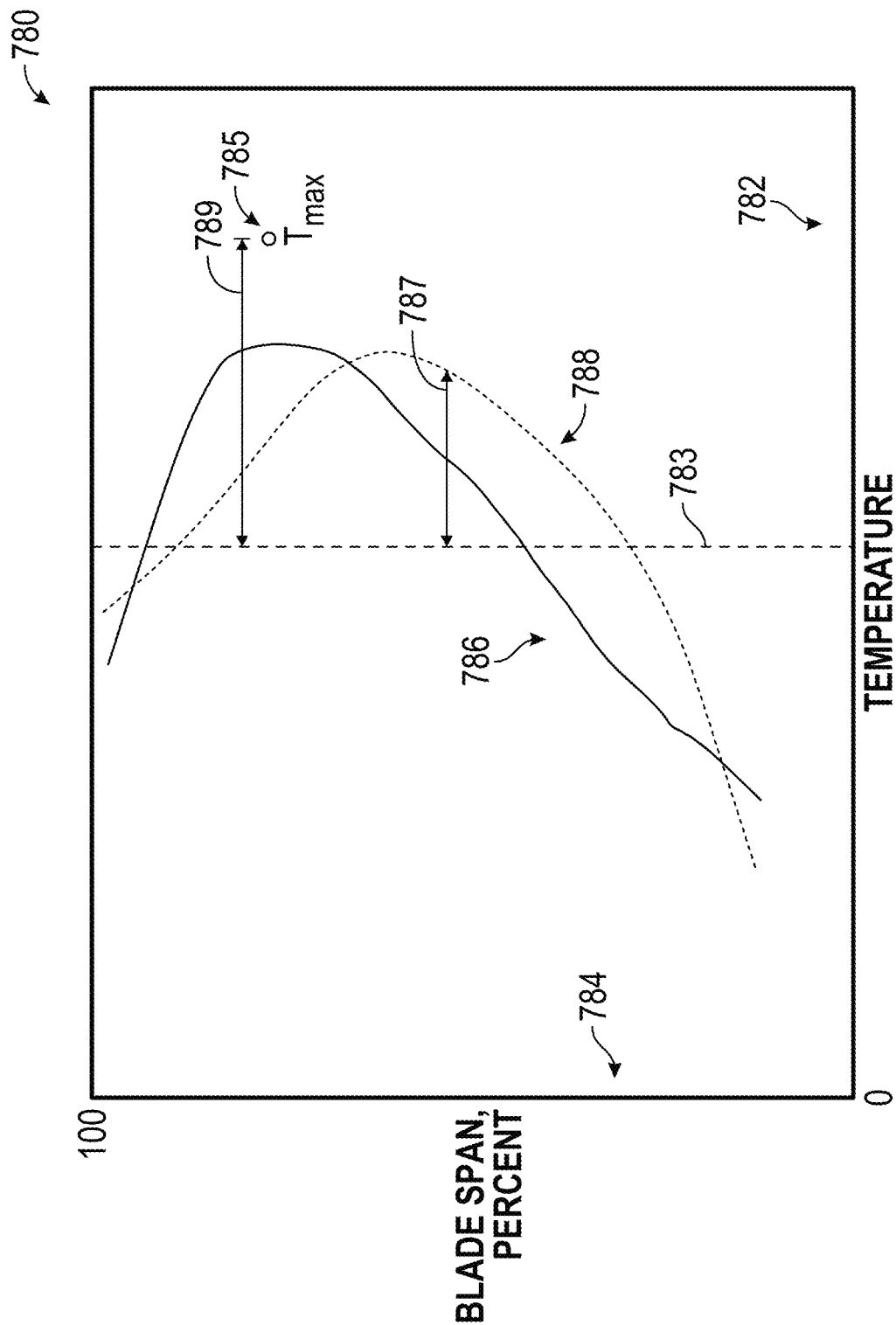
FIG. 7C shows a schematic functional representation of temperature versus blade span at a combustor exit at a predetermined spatial location in the cross section of the combustor of FIG. 7A, according to an embodiment of the present disclosure.

FIG. 7C shows a schematic, functional representation of temperature versus blade span at a combustor exit at a predetermined spatial location in the combustor cross section 700 of FIG. 7A, as used in the integrated fuel cell and combustor assembly 100 used in the gas turbine engine 102 of FIG. 1. Referring to FIG. 7C, a schematic functional representation 780 of temperature versus blade span at combustor exit includes a horizontal axis representing temperature 782, an average gas temperature at the combustor exit plane ($T_4$) 783, a vertical axis representing blade span 784, a maximum gas temperature in the radial and circumferential directions at a combustor exit ($T_4^{max}$) 785, a first reference temperature 787, a second reference temperature 789, a reference design profile 786 showing reference distribution of temperature versus blade span, and an actual design profile 788 showing actual distribution of temperature versus blade span.

The distribution of the combustor exit temperature ($T_4$) is quantified in the art in terms of a 'Profile Factor' (PrF) and a 'Pattern Factor' (PtF). The 'Profile Factor' (PrF) or radial pattern factor, characterized as the first reference temperature 787 in FIG. 7C, is defined as the average temperature across the span, non-dimensionalized to the rise of temperature, from a temperature at combustor entry, T3, to a temperature at combustor exit, T4. The radial pattern factor drives turbine blade distress. The 'Pattern Factor' (PtF), characterized as the second reference temperature 789 in FIG. 7C, is defined as the peak temperature across a blade-span, non-dimensionalized to the rise of temperature, from a temperature at combustor entry, T3, to a temperature at combustor exit, T4. Pattern Factor drives the nozzle distress.

The objective of an optimal combustor-turbine design is to provide a lower temperature at the turbine blade root, where mechanical stresses are highest, and, peaks above the mid-height of the blade.

$$PtF = \frac{T_4^{max}(R) - T_4}{T_4 - T_3}$$

$$PrF = \frac{T_4^{avg}(R) - T_4}{T_4 - T_3}$$

PtF is the Pattern Factor.
PrF is the Profile Factor.
R is the given radius at the combustor exit.
$T_3$ is the average gas temperature at the combustor inlet plane.
$T_4$ is the average gas temperature at the combustor exit plane.
$T_4^{avg}$ is the average gas temperature at the given radius R at the combustor exit.

$T_4^{max}$ is the maximum gas temperature in the radial and circumferential directions at the combustor exit.

Referring to FIG. 7C, the SOFC layout is designed to serve for a desired radial T4 distribution in conformance with a design principle that the desired average radial distribution of temperature profile is the one that peaks above the mid-height of the blade. Accordingly, an unsymmetrical SOFC layout is put around the combustor liner, positioning more SOFC in series connection, or a longer cell on the exterior liner and fewer SOFC in series connection, or a shorter cell on the interior liner surface. The exemplary fuel cell control groups (712, 722, 732, 742, 752, 762) and (714, 724, 734, 744, 754, 764) are arranged in a predetermined electrical configuration about the combustor geometry and each of the fuel cell control groups (712, 722, 732, 742, 752, 762) and (714, 724, 734, 744, 754, 764) has an adjustable electrical current bias. The fuel cells are connected in series along an axial direction of the combustor, or along a circumferential section of the combustor, or a combination of both. Further, a distribution of the combustor exit temperature about the combustor geometry is controlled by adjusting the electrical current bias of at least one of the of fuel cell control groups (712, 722, 732, 742, 752, 762) and (714, 724, 734, 744, 754, 764).

Further, the fuel cell control groups (712, 722, 732, 742, 752, 762) that are integrated within an outer liner of the combustor include higher number of fuel cells compared to the fuel cell control groups (714, 724, 734, 744, 754, 764) that are integrated within the inner liner of the combustor. Further, any fuel cell within the fuel cell control groups (712, 722, 732, 742, 752, 762) has higher electrical capacity, or higher thermal capacity, or larger cell area, or lower fuel cell age, or any combination of these, compared to any fuel cell within the fuel cell control groups (714, 724, 734, 744, 754, 764).

The SOFC layout architecture described above operationalizes a real-time and dynamically controlled configuration that overcomes disadvantages of current adjustment methods that are associated with more operational control arrangements for combustor exit temperature balancing. Even though SOFC exhaust gas (800° C.) is coolant for the combustor, the thermal mass of the SOFC exhaust gas still works as a heat source due to the unspent fuel combustion in the combustor chamber. Positioning a fewer number of fuel cells in series or fuel cells of a smaller size on the exterior liner surface makes the blade root cooler than the blade tip.

In operation, when there are hot spots (as visualized by the heat-map scale 792 shown in FIG. 7A), for example, in second control region 720 and third control region 730 in the combustor exit plane, the electrical current (as visualized by the reference electrical current scale 794) drawn from the corresponding fuel cell control groups (722/724 and 732/734, respectively) are adjusted, so that more internal energy converts to electrical power in second control region 720 and third control region 730 with less combustion enthalpy left for injecting into these regions. In this way, the hot spots in second control region 720 and third control region 730 are reduced and even eliminated. Similar spatial balancing is applied in the axial direction to balance the axial temperature profile at combustion exit.

Figure 8:
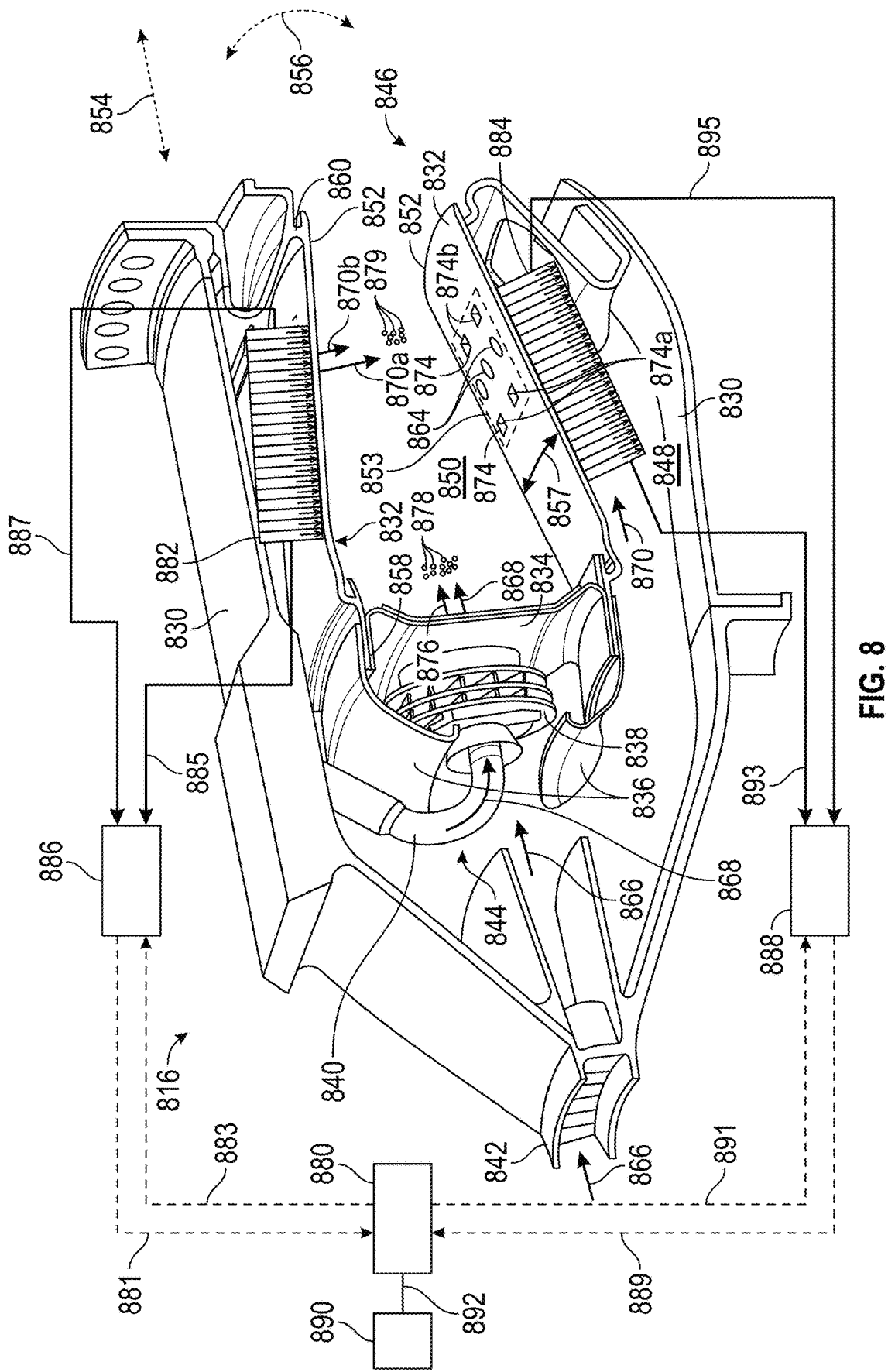
FIG. 8 is a schematic illustration of a portion of a combustor of an integrated fuel cell and combustor assembly used in a gas turbine engine, according to an embodiment of the present disclosure.

FIG. 8 illustrates a schematic illustration of a portion of the combustor 816 of the integrated fuel cell and combustor assembly 100 used in the gas turbine engine 102 of FIG. 1, according to an embodiment of the present disclosure. In the illustrated embodiment, the portion of the combustor 816 includes a casing 830, a combustor liner 832, a dome assembly 834, a cowl assembly 836, a swirler assembly 838, and a fuel flowline 840. The combustor 816 is operatively coupled to a compressor via a compressor diffuser nozzle 842 and to a turbine (not shown in FIG. 8). An upstream end 844 of the combustor 816 is operatively coupled to the compressor and a downstream end 846 of the combustor 816 is operatively coupled to the turbine. The combustor liner 832 is disposed within the casing 830 to define a passageway 848 therebetween the casing 830 and the combustor liner 832. The dome assembly 834 is disposed at the upstream end 844 of the combustor 816 and includes an opening (not labeled) for receiving and holding the swirler assembly 838.

The swirler assembly 838 also includes an opening for receiving and holding the fuel flowline 840. The fuel flowline 840 is further coupled to a fuel source disposed outside the casing 830 and configured to receive the fuel from the fuel source. The swirler assembly 838 can include a plurality of swirlers (not shown) configured to swirl the compressed fluid before injecting it into an annular combustion zone 850. The fuel flowline 840 is configured to inject the fuel into the annular combustion zone 850, where the compressed fluid is mixed with the fuel and ignited to generate combustion gas. The cowl assembly 836 is configured to hold the combustor liner 832, the swirler assembly 838, and the dome assembly 834 together.

The combustor liner 832 includes a panel 852, which is an annular combustion chamber defining the annular combustion zone 850. The panel 852 extends along an axial direction 854 and a circumferential direction 856 to define the annular combustion zone 850 therebetween. The panel 852 extends axially from an upstream end portion 858 of the combustor liner 832 to a downstream end portion 860 of the combustor liner 832. The panel 852 is operatively coupled to the dome assembly 834 and the cowl assembly 836 at the upstream end portion 858. Further, the panel 852 is operatively coupled to the turbine at the downstream end portion 860.

Parts 853, 857, 864, 874, 874a, 874b, and 879 of FIG. 8 correspond to analogous parts 52a, 56a, 62, 72, 72a, 72b, and 78a, respectively, of FIG. 2 of US 2021/0003281 A1, which is incorporated by reference herein in its entirety. In one embodiment, the combustor liner 832 includes at least one first through-hole 864 disposed on a section 853 of the panel 852 in a first row (not labeled) extending along the circumferential direction 856. The combustor liner 832 further includes a plurality of second through-holes 874 disposed on the section 853 of the panel 852. The plurality of second through-holes 874 is spaced apart from each other along the axial direction 854 and the circumferential direction 856. The plurality of second through-holes 874 is arranged adjacent to the at least one first through-hole 864. Further, the plurality of second through-holes 874 includes a first set of through-holes 874a arranged in a second row (not labeled), and a second set of through-holes 874b arranged in a third row (not labeled) different from the second row. The second and third rows may be extending along the circumferential direction 856. The at least one first through-hole 864 and the plurality of second through-holes 874 collectively cover a circumferential plane 857 of the section 853 of the panel 852 along the first, second, and third rows. The at least one first through-hole 864 and each of the plurality of second through-holes 874 extend normal to the panel 852. The at least one first through-hole 864 and each of the plurality of second through-holes 874 can be inclined relative to the panel 852.

During operation, the compressor diffuser nozzle 842 is configured to direct a compressed fluid 866 from the compressor to the combustor. A portion 870 of the compressed fluid 866 is directed towards the passageway 848 defined between the casing 830 and the combustor liner 832. Further, another portion 868 of the compressed fluid 866 is directed towards the swirler assembly 838. The swirler assembly 838 is configured to impart swirling motion to the other portion 868 of the compressed fluid 866 before directing the other portion 868 into the annular combustion zone 850 (or annular combustion chamber). Further, the fuel flowline 840 is configured to direct a fuel 876 into the annular combustion zone 850, where the fuel 876 is mixed with the other portion 868 before igniting the mixture in the annular combustion zone 850 to generate a combustion gas 878.

The combustor liner 832 is configured to direct the combustion gas 878 from the upstream end portion 858 to the downstream end portion 860. The combustion gas 878 can have an unburned portion 879 of the fuel 876 in the combustion gas 878 and the at least one first through-hole 864 is configured to direct a first sub-portion 870a of the portion 870 of the compressed fluid 866 from the passageway 848 into the annular combustion zone 850 so as to aid in further combustion (oxidation) of the unburned portion 879 of the fuel 876 in the combustion gas 878. The plurality of second through-holes 874 is configured to direct a second sub-portion 870b of the portion 870 of the compressed fluid 866 from the passageway 848 into the annular combustion zone 850 so as to distribute the second sub-portion 870b of the compressed fluid 866 around the circumferential plane 857 of the section 853 of the panel 852 collectively covered by the at least one first through-hole 864 and the plurality of second through-holes 872 and purge out jet wakes.

A portion of the second sub-portion 870b further enters the annular combustion zone 850 from the circumferential plane 857 to aid in combustion of the unburned portion 879 of the fuel 876 in the combustion gas 878. The combustor liner 832 is configured to direct the combustion gas 878 from the downstream end portion 860 to the turbine (not shown).

The at least one first through-hole 864 is sized and designed such that the first sub-portion 870a of the portion 870 of the compressed fluid 866 is directed into the annular combustion zone 850 for aiding combustion (oxidation) of the unburned portion 879 of the fuel 876 in the combustion gas 878. Similarly, the plurality of second through-holes 874 is sized and designed such that the second sub-portion 870b of the portion 870 of the compressed fluid 866 is directed into the annular combustion zone 850 to diffuse around the inner surface of the section 853 of the panel 852 for purging out the jet wakes, which may have formed around the at least one first through-hole 864, for example, at an aft region of the at least one first through-hole 864.

Purging out of the jet wakes results in (i) preventing formation of hot spots on the section 853 of the panel and (ii) moving a portion (i.e., the unburned portion 879) of the combustion gas 878 dispersed around the at least one first through-hole 864 to the annular combustion zone 850. This results in regulating (i) an inner spatial temperature of the section 853 of the panel 852 along the circumferential plane 857, (ii) emission from the combustion gas 878, and (iii) formation of an NOx forming zone at the circumferential plane 857. A flow of the portion 870 of the compressed fluid 866 along the passageway 848 may further result in cooling the outer surface of the combustor liner 832, and a flow of the first sub-portion 870a and the second sub-portion 870b of the compressed fluid 866 into the annular combustion zone 850 results in further cooling the inner surface of the combustor liner 832, thereby regulating the temperature of the combustion chamber.

Referring further to FIG. 8, a first fuel cell control group 882 on the top and a second fuel cell control group 884 on the bottom are two exemplary fuel cell control groups that are configured along the combustor liner 832. The first fuel cell control group 882 and the second fuel cell control group 884 can correspond to any two of the exemplary fuel cell control groups (512, 522, 532, 542, 552, 562) in FIG. 5B. The first fuel cell control group 882 is electrically connected to a first power converter 886 by a plurality of power supply cables 885 and 887. The second fuel cell control group 884 is electrically connected to a second power converter 888 by a plurality of power supply cables 893 and 895.

The power converters 886 and 888 control the electrical current drawn from the corresponding fuel cell control groups 882 and 884, respectively, and convert the electrical power from DC power to either DC power at another voltage level or AC power. An SOFC controller 880 communicates with both of the power converters 886 and 888, and sends corresponding current or power setpoint signals. Specifically, a power setpoint control signal 883 runs from the SOFC controller 880 to the power converter 886 and a voltage-current feedback signal 881 runs from the power converter 886 to the SOFC controller 880. In a similar manner, a power setpoint control signal 891 runs from the SOFC controller 880 to the second power converter 888 and a voltage-current feedback signal 889 runs from the second power converter 888 to the SOFC controller 880.

In operation, a default nominal current setpoint for each of the power converters 886 and 888 can be the same, such as 100A. During the combustor exit temperature distribution regulation, the SOFC controller 880 adjusts the electrical current bias for each of the power converters 886 and 888 (and, hence, for each of the corresponding fuel cell control groups 882 and 884, respectively), in response to the combustor exit temperature T4, profile factor and/or pattern factor. If the combustor exit temperature in a region corresponding to the fuel cell control group 882 is higher than the combustor exit temperature in another region corresponding to the fuel cell control group 884, then the current setpoint for the power converter 886 is set higher than the current setpoint for the power converter 888. For example, the current bias is set (+5A) for the power converter 886 and (−5A) for the power converter 886. In this case, the combustor exit temperature profile is controlled while the same total current or total power output of the fuel cells is maintained constant. Relating to aircraft applications, total power may be constrained by electrical load requirement aircraft and that may not be allowed to change at a given time. The system and method of control described in relation to FIG. 8 enables adjustment of the power or current allocation among the fuel cell control groups.

The SOFC controller 880 is specifically configured to dynamically control the fuel cell power output and to maintain a real-time spatial distribution of the combustor exit temperature T4 in conformance with a predetermined reference distribution of combustor exit temperature across a geometry of the combustor 816. The reference distribution of the combustor exit temperature conforms to a reference distribution of a profile factor of the combustor exit temperature, or a pattern factor of the combustor exit temperature, or any combination thereof. The reference distribution can be a derived lookup table. Referring to FIG. 8, a gas turbine engine 800 includes a derived reference lookup table 890 connected to the SOFC controller 880 by a connection line 892. The reference lookup table 890 enlists combustor exit temperature profile factor and pattern factor. The reference distribution can be a reference unsymmetrical radial distribution corresponding to a reference blade profile of a reference turbine.

Physically controlling groups of SOFC to augment a distribution of combustor exit temperature (T4) is challenging because of low control flexibility of the fuel and air manifolds that connect the groups of SOFC to the combustor liner. Contrarily, controlling the electrical current profile for each control group of SOFC in conformance with an established reference distribution is advantageous. In operation, the electrical current setpoints across the control groups of SOFC located corresponding to the hot spot combustion regions are increased to consume more fuel electrochemically, and to generate more electrical power or work, leaving less fuel for combustion in the combustor. Reduced fuel discharge from the control groups of SOFC reduces the pattern factor or hot spots in the corresponding regions of the combustor liner.

Figure 9:
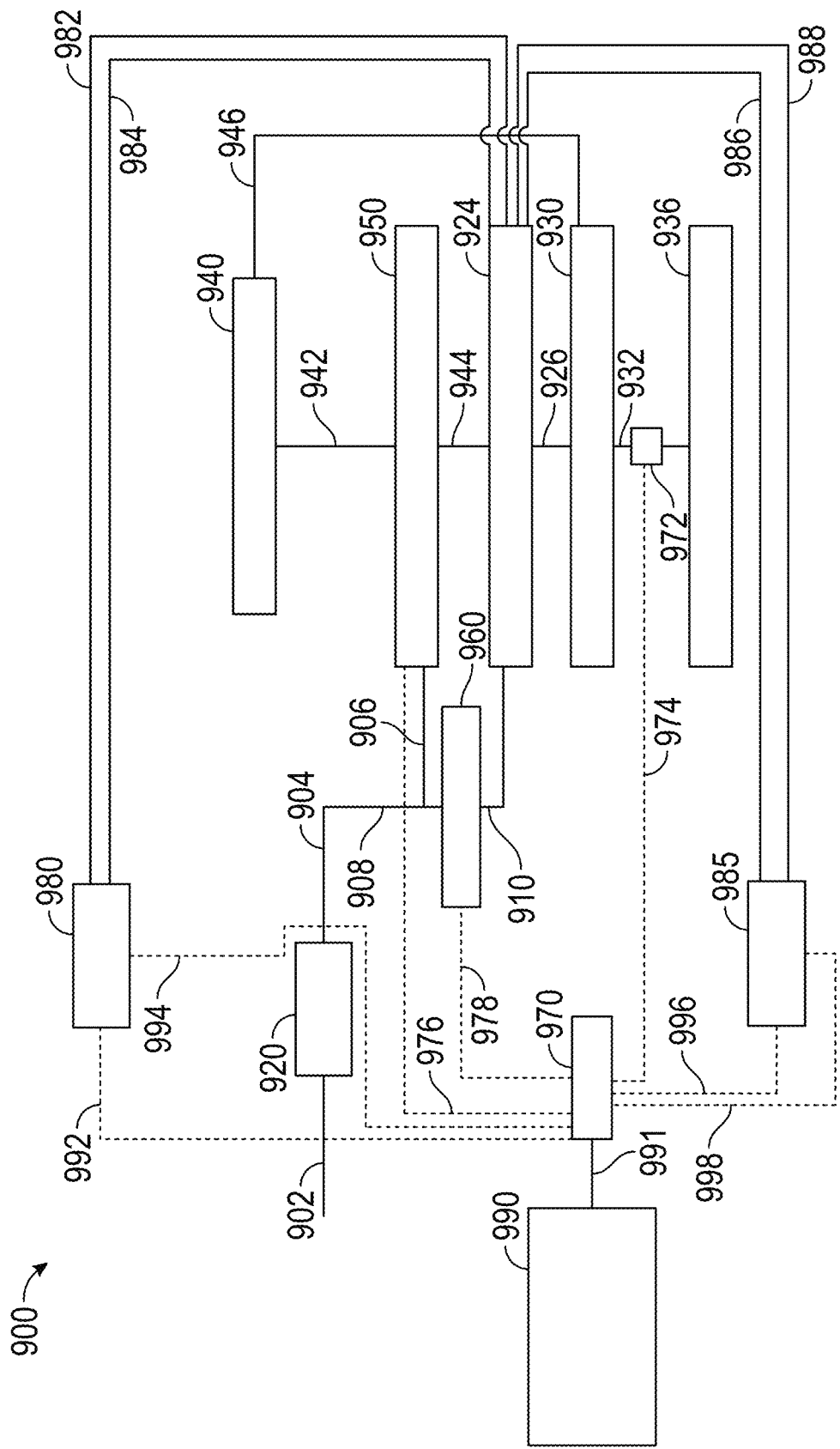
FIG. 9 shows a schematic illustration of the operation of an integrated fuel cell and combustor assembly used in a gas turbine engine, according to an embodiment of the present disclosure.

FIG. 9 shows a schematic illustration of the operation of the integrated fuel cell and combustor assembly 100 used in the gas turbine engine 102 of FIG. 1, according to an embodiment of the present disclosure. As shown in FIG. 9, a gas turbine engine 900 includes a compressor 920, a fuel cell 924 that is disposed downstream of the compressor 920 and upstream of a combustor 930 and/or integrated within a liner region of the combustor 930, and a turbine 936 that is disposed downstream of the combustor 930.

A fuel source 940 is provided for directing a fuel stream 942 into a fuel processing unit 950 (e.g., a catalytic partial oxidation converter) for developing a hydrogen rich fuel stream 944 that is fed into the fuel cell 924. The fuel source 940 also directs another fuel stream 946 into the combustor 930 for the operation of a pilot/main burner (not shown) of the combustor 930.

The compressor 920 of the gas turbine engine 900 receives an inlet air 902 and compresses this air into compressor exit air 904. A portion 906 of the compressor exit air 904 is directed into the fuel processing unit 950 for developing the hydrogen rich fuel stream 944 for the fuel cell 924. Another portion 908 of the compressor exit air 904 is directed into an air processing unit 960 (e.g., a heat exchanger and/or a preburner system).

The air processing unit 960 (e.g., a heat exchanger and/or preburner system) is configured to process (i.e., to heat or to cool) air stream 908 and to generate a processed air stream 910 to be directed into the fuel cell 924 to facilitate the functioning of the fuel cell 924. The processed air stream 910 and the hydrogen rich fuel stream 944 that are directed into the fuel cell 924, are at least partially converted into electrical energy. An effluent 926 from the fuel cell 924 is directed into the combustor 930. The effluent 926 includes unused air, unburned fuel, and/or other gaseous constituents from the fuel cell 924. The effluent 926 is combusted (at least partially) in the combustor 930. The combustion in the combustor 930 generates combustor exit air 932 that is directed into the turbine 936, to thereby drive the turbine 936.

As is further shown in FIG. 9, the gas turbine engine 900 includes a controller 970. The controller 970 is configured to control the functioning of the various components of the gas turbine engine 900 and/or to optimize the functioning of the various components of the gas turbine engine 900, including, for example, the fuel processing unit 950, the air processing unit 960, the fuel cell 924, and/or the combustor 930. In particular, a detector element 972 (or another type of detecting device, such as, e.g., a virtual detector based on first-principle physics based model or data-driven model) monitors the temperature T4 of the combustor exit air 932 leaving the combustor 930.

An exemplary detection signal 974, generated by the detector element 972 and representing a detected value of the temperature T4 of the combustor exit air 932 leaving the combustor 930, is sent to the controller 970. The controller 970 senses the detection signal 974 and controls the functioning of the various components of the gas turbine engine 900, including, for example, the fuel processing unit 950 (via a control signal 976), the air processing unit 960 (via a control signal 978), the fuel cell 924, and/or the combustor 930, based on the sensed detection signal 974.

The gas turbine engine 900 further includes a first power converter 980, connected with the fuel cell 924 by a plurality of power supply cables 982 and 984 and a second power converter 985, connected with the fuel cell 924 by a plurality of power supply cables 986 and 988. The gas turbine engine 900 further includes a derived reference lookup table 990 connected to the controller 970 by a connection line 991. A power setpoint control signal 992 runs from the controller 970 to the first power converter 980 and a voltage-current feedback signal 994 runs from the first power converter 980 to the controller 970. In a similar manner, a power setpoint control signal 996 runs from the controller 970 to the second power converter 985 and a voltage-current feedback signal 998 runs from the second power converter 985 to the controller 970.

The controller 970 is configured to spatially balance a real-time distribution of the combustor exit temperature (T4) about the combustor geometry, based on at least one of a plurality of predetermined fuel cell parameters, such as, electrical current setpoints of a power converter connected to the fuel cells, electrical current bias of the fuel cells, number of fuel cells, size of the fuel cells, electrical capacity of the fuel cells, thermal capacity of the fuel cells, cell area of the fuel cells, and age of the fuel cells. Further, the controller 970 is configured to control the functioning of the fuel cell 924, the fuel processing unit 950 (e.g., a catalytic partial oxidation converter), and/or the combustor 930 depending upon the detection signal 974 and, thus, the combustor exit temperature T4 of the turbine 936. The fuel cell temperature is maintained below a thermal shock range that allows for higher reliability and durability of the fuel cell. The controller 970 is configured to adjust the fuel utilization, oxygen-to-fuel ratio, and/or the fuel flowrate to the fuel cell 924 and/or the combustor 930. In response to the exit temperature T4 of the combustor 930, the controller 970 is configured to adjust the fuel flowrate of the air processing unit 960 (e.g., pre-heater system). The fuel cell fuel flowrate, air flowrate, electrical current all affects the combustor exit temperature. The engine operation conditions such as compressor bleed valve, combustor main fuel further affect the combustor exit temperature.

Figure 10:
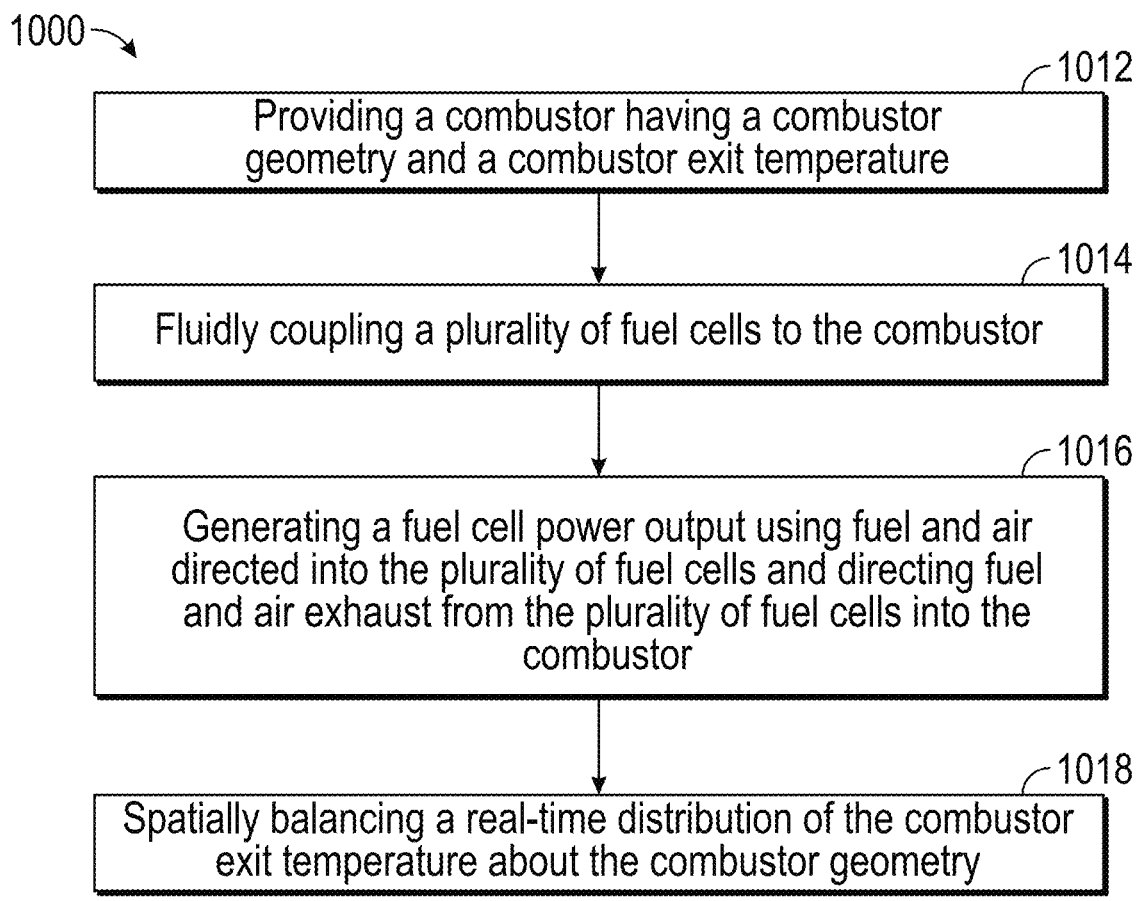
FIG. 10 shows a schematic flowchart of a method of operating an integrated fuel cell and combustor assembly used in a gas turbine engine, according to an embodiment of the present disclosure.

FIG. 10 shows a schematic flowchart of a method 1000 of operating the integrated fuel cell and combustor assembly 100 used in the gas turbine engine 102 of FIG. 1, according to an embodiment of the present disclosure. The method 1000 includes the operations performed in generating thrust and electrical current using the fuel cell and combustor assembly 100 (shown in FIG. 1) described herein. At step 1012, a combustor is provided, the combustor having a combustor geometry and a combustor exit temperature. At step 1014, a number of fuel cells is fluidly coupled to the combustor. For example, the fuel cells are connected in series to build up a direct current that is created in the fuel cells. At step 1016, a power output is generated in the fuel cells using fuel and air directed into the plurality of fuel cells, and fuel and air exhaust are directed from the fuel cells into the combustor. At step 1018, a real-time distribution of the combustor exit temperature is spatially balanced about the combustor geometry.

The integrated fuel cell and combustor assembly of the present disclosure provides a system for achieving a desired combustor exit temperature (T4) distribution that is important for turbine and nozzle life. SOFC, positioned at different regions within a zone of interest of the combustor liner, are electrically grouped in several fuel cell control groups. The electrical current bias from the SOFC corresponding to the regions of interest with peak and low T4 distribution are dynamically adjusted in real-time to achieve the desired T4 distribution across a combustion geometry across tangential, radial, axial, and circumferential directions.

The integrated fuel cell and combustor assembly and related method of the present disclosure provides a system for dynamically achieving lower temperature at the turbine blade root, where mechanical stresses are highest, and at the tip of a blade that is most difficult to cool, in conformance with design recommendations regarding T4 pattern factor (hot spot) and profile factor (average). The desired average radial distribution of temperature profile is the one that peaks above the mid-height of the blade. The current integrated fuel cell and combustor assembly of the present disclosure provides a system and a method to achieve the desired average radial distribution of temperature profile.

Further advantages of electrically grouping fuel cells into control groups include real-time adjustment of the T4 spatial distribution across different operating conditions that reduces NOx emission and overall thermal stress of the turbine blade and nozzles, and enhances service life of the engine.

Further aspects of the present disclosure are provided by the subject matter of the following clauses.

An integrated fuel cell and combustor assembly includes a combustor having a combustor geometry and a combustor exit temperature, and a plurality of fuel cells fluidly coupled to the combustor. The plurality of fuel cells is configured to generate a fuel cell power output using fuel and air directed into the plurality of fuel cells and to direct a fuel and air exhaust from the plurality of fuel cells into the combustor. The plurality of fuel cells comprises a plurality of fuel cell control groups arranged in a predetermined electrical configuration about the combustor geometry, each of the plurality of fuel cell control groups having an adjustable electrical current bias.

The assembly according to any preceding clause, wherein the plurality of fuel cells is connected in series along an axial direction of the combustor, or along a circumferential section of the combustor, or a combination of both.

The assembly according to any preceding clause, wherein a distribution of the combustor exit temperature about the combustor geometry is controlled by adjusting the electrical current bias of at least one of the plurality of fuel cell control groups.

The assembly according to any preceding clause, wherein the plurality of fuel cells comprises a first plurality of fuel cells integrated within an outer liner of the combustor, or a second plurality of fuel cells integrated within an inner liner of the combustor, or any combination thereof. The first plurality of fuel cells comprises a higher number of fuel cells compared to the second plurality of fuel cells.

The assembly according to any preceding clause, wherein any fuel cell of the first plurality of fuel cells comprises a higher electrical capacity, or a higher thermal capacity, or a larger cell area, or a lower fuel cell age, or any combination thereof, compared to any fuel cell of the second plurality of fuel cells.

An integrated fuel cell and combustor assembly includes a combustor having a combustor geometry and a combustor exit temperature, a plurality of fuel cells fluidly coupled to the combustor, and a controller configured to spatially balance a real-time distribution of the combustor exit temperature about the combustor geometry, based on at least one of a plurality of predetermined fuel cell parameters. The plurality of fuel cells is configured to generate a fuel cell power output using fuel and air directed into the plurality of fuel cells and to direct a fuel and air exhaust from the plurality of fuel cells into the combustor.

The assembly according to any preceding clause, further comprising a turbine disposed downstream from the combustor, wherein the combustor is configured to combust the fuel and air exhaust from the plurality of fuel cells into one or more gaseous combustion products that power the turbine.

The assembly according to any preceding clause, wherein the plurality of fuel cells is disposed upstream of the combustor, or integrated within an inner liner of the combustor, or integrated within an outer liner of the combustor, or any combination thereof.

The assembly according to any preceding clause, further comprising at least one detector element configured to detect the combustor exit temperature and to send a detection signal to the controller.

The assembly according to any preceding clause, further comprising a compressor that is fluidly coupled upstream of the combustor and the plurality of fuel cells. The compressor is configured to generate compressed air and to direct a portion of the compressed air into the plurality of fuel cells.

The assembly according to any preceding clause, wherein the plurality of fuel cells comprise a plurality of fuel cell control groups arranged in a predetermined configuration about the combustor geometry, each of the plurality of fuel cell control groups having an adjustable electrical current bias.

The assembly according to any preceding clause, wherein the controller is configured to dynamically control an electrical current of each of the plurality of fuel cell control groups and to maintain the real-time distribution of the combustor exit temperature in conformance with a predetermined reference distribution of the combustor exit temperature about the combustor geometry.

The assembly according to any preceding clause, wherein a total power output of the plurality of fuel cell control groups is maintained constant.

The assembly according to any preceding clause, wherein the predetermined reference distribution of the combustor exit temperature comprises a reference distribution of a profile factor of the combustor exit temperature, or a pattern factor of the combustor exit temperature, or any combination thereof.

The assembly according to any preceding clause, wherein the predetermined reference distribution comprises a reference unsymmetrical radial distribution corresponding to a reference blade profile of a reference turbine.

The assembly according to any preceding clause, wherein each of the plurality of fuel cell control groups comprises a collection of fuel cells unified by a common spatial relationship with respect to the combustor geometry.

The assembly according to any preceding clause, wherein the controller is further configured to selectively control an electrical current bias for each of the plurality of fuel cell control groups to generate the fuel cell power output.

The assembly according to any preceding clause, wherein the common spatial relationship comprises proximity in a tangential direction of the combustor, or a radial direction of the combustor, or an axial direction of the combustor, or a circumferential section of the combustor, or any combination thereof.

The assembly according to any preceding clause, further comprising a fuel processing unit that is fluidly connected to the plurality of fuel cells and a fuel source that is fluidly connected to the fuel processing unit. The fuel processing unit is configured to develop a hydrogen rich fuel stream to be directed into the plurality of fuel cells. A portion of fuel is directed from the fuel source to the fuel processing unit for developing the hydrogen rich fuel stream.

The assembly according to any preceding clause, wherein the electrical current bias for each of the plurality of fuel cell control groups is either increased when the combustor exit temperature is equal to a predefined threshold or exceeds a predefined threshold, or decreased when the combustor exit temperature is lower than a predefined threshold.

The assembly according to any preceding clause, further comprising a power converter electrically coupled to the plurality of fuel cell control groups. The electrical current bias for each of the plurality of fuel cell control groups is adjusted by adjusting a power output drawn by the power converter, or a fuel utilization of the fuel processing unit, or an oxygen-to-fuel ratio of the fuel processing unit, or a total fuel flow rate, or a temperature of the plurality of fuel cells, or any combination thereof.

A method of operating an integrated fuel cell and combustor assembly includes providing a combustor having a combustor geometry and a combustor exit temperature, fluidly coupling a plurality of fuel cells to the combustor, generating a fuel cell power output using fuel and air directed into the plurality of fuel cells and directing a fuel and air exhaust from the plurality of fuel cells into the combustor, and spatially balancing a real-time distribution of the combustor exit temperature about the combustor geometry, based on at least one of a plurality of predetermined fuel cell parameters.

The method according to any preceding clause, further comprising fluidly coupling a compressor upstream of the combustor and the plurality of fuel cells, the compressor generating compressed air, and directing a portion of the compressed air into the plurality of fuel cells.

The method according to any preceding clause, further comprising disposing a turbine downstream from the combustor and combusting the fuel and air exhaust from the plurality of fuel cells in the combustor to produce one or more gaseous combustion products that power the turbine.

The method according to any preceding clause, wherein the fluidly coupling a plurality of fuel cells to the combustor comprises disposing the plurality of fuel cells upstream of the combustor, or integrating the plurality of fuel cells within an inner liner of the combustor, or integrating the plurality of fuel cells within an outer liner of the combustor, or any combination thereof.

The method according to any preceding clause, further comprising providing at least one detector element to detect the combustor exit temperature and to produce a detection signal from the detector element. The detection signal represents the combustor exit temperature. The spatially balancing a real-time distribution of the combustor exit temperature comprises sensing the detection signal, and spatially balancing a real-time distribution of the combustor exit temperature based on the sensed detection signal.

The method according to any preceding clause, wherein the fluidly coupling a plurality of fuel cells to the combustor comprises fluidly coupling a plurality of fuel cell control groups arranged in a predetermined configuration about the combustor geometry. Each of the plurality of fuel cell control groups has an adjustable electrical current bias.

The method according to any preceding clause, wherein the spatially balancing a real-time distribution of the combustor exit temperature comprises dynamically controlling an electrical current of each of the plurality of fuel cell control groups and maintaining the real-time distribution of the combustor exit temperature in conformance with a predetermined reference distribution of the combustor exit temperature about the combustor geometry.

The method according to any preceding clause, wherein a total power output of the plurality of fuel cell control groups is maintained constant.

The method according to any preceding clause, wherein the predetermined reference distribution of the combustor exit temperature comprises a reference distribution of a profile factor of the combustor exit temperature, or a pattern factor of the combustor exit temperature, or any combination thereof.

The method according to any preceding clause, wherein the predetermined reference distribution comprises a reference unsymmetrical radial distribution corresponding to a reference blade profile of a reference turbine.

The method according to any preceding clause, wherein the fluidly coupling a plurality of fuel cell control groups comprises fluidly coupling a collection of fuel cells unified by a common spatial relationship with respect to the combustor geometry.

The method according to any preceding clause, wherein the generating a fuel cell power output comprises selectively controlling an electrical current bias for each of the plurality of fuel cell control groups to generate the fuel cell power output.

The method according to any preceding clause, wherein the common spatial relationship comprises proximity in a tangential direction of the combustor, or a radial direction of the combustor, or an axial direction of the combustor, or a circumferential section of the combustor, or any combination thereof.

The method according to any preceding clause, further comprising fluidly connecting a fuel processing unit to the plurality of fuel cells, configuring the fuel processing unit to develop a hydrogen rich fuel stream, directing the hydrogen rich fuel stream into the plurality of fuel cells, and fluidly connecting a fuel source to the fuel processing unit and directing a portion of fuel from the fuel source to the fuel processing unit for developing the hydrogen rich fuel stream.

The method according to any preceding clause, wherein the generating a fuel cell power output comprises either increasing the electrical current bias for each of the plurality of fuel cell control groups when the combustor exit temperature is equal to a predefined threshold or exceeds a predefined threshold, or decreasing the electrical current bias for each of the plurality of fuel cell control groups when the combustor exit temperature is lower than a predefined threshold.

The method according to any preceding clause, further comprising electrically coupling a power converter to the plurality of fuel cell control groups. The increasing the electrical current bias for each of the plurality of fuel cell control groups, or the decreasing the electrical current bias for each of the plurality of fuel cell control groups, comprises adjusting a power output drawn by the power converter, or fuel utilization of a fuel processing unit, or an oxygen-to-fuel ratio of a fuel processing unit, or a total fuel flow rate, or a temperature of the plurality of fuel cells, or any combination thereof.

Although the foregoing description is directed to the preferred embodiments, it is noted that other variations and modifications will be apparent to those skilled in the art, and may be made without departing from the spirit or scope of the disclosure. Moreover, features described in connection with an embodiment may be used in conjunction with other embodiments, even if not explicitly stated above.

The invention claimed is:

1. An integrated fuel cell and combustor assembly, the assembly comprising:
   a combustor having a combustor geometry and a combustor exit temperature;
   a plurality of fuel cells fluidly coupled to the combustor, the plurality of fuel cells being configured to generate a fuel cell power output using fuel and air directed into the plurality of fuel cells and to direct a fuel and air exhaust from the plurality of fuel cells into the combustor; and
   a controller, wherein the plurality of fuel cells is grouped into a plurality of fuel cell control groups arranged in a predetermined electrical configuration about the combustor geometry, each of the plurality of fuel cell control groups having an adjustable electrical current bias, wherein the controller is configured to selectively and independently control the adjustable electrical current bias for each of the fuel cell control groups of the plurality of fuel cell control groups.

2. The assembly of claim 1, wherein each fuel cell of the plurality of fuel cells is connected in series along an axial direction of the combustor, or along a circumferential section of the combustor, or a combination of both.

3. The assembly of claim 1, wherein the distribution of the combustor exit temperature about the combustor geometry is controlled by adjusting the electrical current bias of at least one fuel cell control group of the plurality of fuel cell control groups.

4. The assembly of claim 1, wherein the plurality of fuel cells includes a first plurality of fuel cells integrated within an outer liner of the combustor and grouped into a first plurality of fuel cell control groups, and a second plurality of fuel cells integrated within an inner liner of the combustor and grouped into a second plurality of fuel cell control groups, wherein the first plurality of fuel cell control groups comprises a higher number of fuel cells compared to the second plurality of fuel cell control groups, and
   further wherein any fuel cell of the first plurality of fuel cells comprises a higher electrical capacity, or a higher thermal capacity, or a larger cell area, or a lower fuel cell age, or any combination thereof, compared to any fuel cell of the second plurality of fuel cells.

5. An integrated fuel cell and combustor assembly, the assembly comprising:
   a combustor having a combustor geometry and a combustor exit temperature;
   a plurality of fuel cells fluidly coupled to the combustor, the plurality of fuel cells being configured to generate a fuel cell power output using fuel and air directed into the plurality of fuel cells and to direct a fuel and air exhaust from the plurality of fuel cells into the combustor, wherein the plurality of fuel cells is grouped into a plurality of fuel cell control groups arranged in a predetermined electrical configuration about the combustor geometry, wherein each fuel cell control group of the plurality of fuel cell control groups has an adjustable electrical current bias; and
   a controller configured to spatially balance a real-time distribution of the combustor exit temperature about the combustor geometry, based on at least one of a plurality of predetermined fuel cell parameters, and wherein the controller is configured to selectively and independently control the adjustable electrical current bias for each fuel cell control group of the plurality of fuel cell control groups.

6. The assembly of claim 5, further comprising a turbine disposed downstream from the combustor, wherein the combustor is configured to combust the fuel and air exhaust from the plurality of fuel cells into one or more gaseous combustion products that power the turbine.

7. The assembly of claim 5, wherein the plurality of fuel cells is disposed upstream of the combustor, or integrated within an inner liner of the combustor, or integrated within an outer liner of the combustor, or any combination thereof.

8. The assembly of claim 5, further comprising at least one detector element configured to detect the combustor exit temperature and to send a detection signal to the controller.

9. The assembly of claim 5, further comprising a compressor that is fluidly coupled upstream of the combustor and the plurality of fuel cells, the compressor being configured to generate compressed air and to direct a portion of the compressed air into the plurality of fuel cells.

10. The assembly of claim 5, wherein the controller is configured to dynamically control an electrical current of each fuel cell control group of the plurality of fuel cell control groups and to maintain the real-time distribution of the combustor exit temperature in conformance with a predetermined reference distribution of the combustor exit temperature about the combustor geometry, and further wherein a total power output of the plurality of fuel cell control groups is maintained constant.

11. The assembly of claim 10, wherein the predetermined reference distribution of the combustor exit temperature comprises a reference distribution of a profile factor of the combustor exit temperature, or a pattern factor of the combustor exit temperature, or any combination thereof.

12. The assembly of claim 10, wherein the predetermined reference distribution comprises a reference unsymmetrical radial distribution corresponding to a reference blade profile of a reference turbine.

13. The assembly of claim 10, wherein each fuel cell control group of the plurality of fuel cell control groups comprises a collection of fuel cells unified by a common spatial relationship with respect to the combustor geometry.

14. The assembly of claim 13, wherein the common spatial relationship comprises proximity in a tangential direction of the combustor, or a radial direction of the combustor, or an axial direction of the combustor, or a circumferential section of the combustor, or any combination thereof.

15. The assembly of claim 13, further comprising:
   a fuel processing unit that is fluidly connected to the plurality of fuel cells, the fuel processing unit being configured to develop a hydrogen rich fuel stream to be directed into the plurality of fuel cells; and
   a fuel source that is fluidly connected to the fuel processing unit, wherein a portion of fuel is directed from the fuel source to the fuel processing unit for developing the hydrogen rich fuel stream.

16. The assembly of claim 15, wherein the adjustable electrical current bias for one or more fuel cell control groups of the plurality of fuel cell control groups is either increased when the combustor exit temperature is equal to a predefined threshold or exceeds a predefined threshold, or decreased when the combustor exit temperature is lower than a predefined threshold.

17. The assembly of claim 16, further comprising a power converter electrically coupled to the plurality of fuel cell control groups, wherein the adjustable electrical current bias for one or more fuel cell control groups of the plurality of fuel cell control groups is adjusted by adjusting a power output drawn by the power converter, or a fuel utilization of the fuel processing unit, or an oxygen-to-fuel ratio of the fuel processing unit, or a total fuel flow rate, or a temperature of the plurality of fuel cells, or any combination thereof.

18. A method of operating an integrated fuel cell and combustor assembly, the method comprising:
providing a combustor having a combustor geometry and a combustor exit temperature;
fluidly coupling a plurality of fuel cells to the combustor, wherein the plurality of fuel cells is subdivided into plurality of fuel cell control groups;
generating a fuel cell power output using fuel and air directed into the plurality of fuel cells and directing a fuel and air exhaust from the plurality of fuel cells into the combustor;
selectively and independently controlling an adjustable electrical current bias for each fuel cell control group of the plurality of fuel cell control groups; and
spatially balancing a real-time distribution of the combustor exit temperature about the combustor geometry, based on at least one of a plurality of predetermined fuel cell parameters.

* * * * *